US009855658B2

(12) United States Patent
Babu

(10) Patent No.: US 9,855,658 B2
(45) Date of Patent: Jan. 2, 2018

(54) DRONE ASSISTED ADAPTIVE ROBOT CONTROL

(71) Applicant: Rahul Babu, Tiburon, CA (US)

(72) Inventor: Rahul Babu, Tiburon, CA (US)

( * ) Notice: Subject to any disclaimer, the term of this patent is extended or adjusted under 35 U.S.C. 154(b) by 162 days.

(21) Appl. No.: 15/073,651

(22) Filed: Mar. 18, 2016

(65) Prior Publication Data

US 2016/0271796 A1 Sep. 22, 2016

Related U.S. Application Data

(60) Provisional application No. 62/135,190, filed on Mar. 19, 2015.

(51) Int. Cl.
*B25J 9/16* (2006.01)
*G05D 1/00* (2006.01)
(Continued)

(52) U.S. Cl.
CPC ............. *B25J 9/163* (2013.01); *B25J 9/1664* (2013.01); *B25J 9/1666* (2013.01); *B25J 9/1674* (2013.01);
(Continued)

(58) Field of Classification Search
CPC ........ B05D 1/02; G01B 21/04; G05D 1/0094; G05B 2219/39016; G05B 2219/40504; G05B 2219/40604; G05B 2219/40609; G05B 2219/40617; G05B 2219/40425; G05B 2219/40005; B25J 11/0075; B25J 9/163; B25J 9/1676; B25J 9/1697; B25J 9/1674; B25J 9/1664; B25J 9/1666; B25J 9/1694
(Continued)

(56) References Cited

U.S. PATENT DOCUMENTS

| 5,471,312 | A | 11/1995 | Watanabe et al. |
| 5,802,201 | A * | 9/1998 | Nayar .................... B25J 9/1697 |
| | | | 382/106 |
| 6,101,455 | A | 8/2000 | Davis |
| 6,194,860 | B1 * | 2/2001 | Seelinger ................. B25J 5/007 |
| | | | 318/586 |

(Continued)

FOREIGN PATENT DOCUMENTS

EP 2784618 A2 10/2014

*Primary Examiner* — Leslie A Nicholson, III
(74) *Attorney, Agent, or Firm* — Ash Tankha; Lipton, Weinberger & Husick

(57) ABSTRACT

A method, a drone device, and an adaptive robot control system (ARCS) for adaptively controlling a programmable robot are provided. The ARCS receives environmental parameters of a work environment where the drone device operates and geometrical information of a target object to be operated on by the programmable robot. The ARCS dynamically receives a calibrated spatial location of the target object in the work environment based on the environmental parameters and a discernment of the target object from the drone device. The ARCS determines control information including parts geometry of the target object, a task trajectory of a task to be performed on the target object, and a collision-free robotic motion trajectory for the programmable robot, and dynamically transmits the control information to the programmable robot via a communication network to adaptively control the programmable robot while accounting for misalignments of the target object in the work environment.

25 Claims, 17 Drawing Sheets

(51) Int. Cl.
*G01B 21/04* (2006.01)
*B25J 11/00* (2006.01)
*B05D 1/02* (2006.01)

(52) U.S. Cl.
CPC .......... *B25J 9/1676* (2013.01); *B25J 9/1694* (2013.01); *B25J 9/1697* (2013.01); *B25J 11/0075* (2013.01); *G01B 21/04* (2013.01); *G05D 1/0094* (2013.01); *B05D 1/02* (2013.01); *G05B 2219/39016* (2013.01); *G05B 2219/40005* (2013.01); *G05B 2219/40425* (2013.01); *G05B 2219/40504* (2013.01); *G05B 2219/40604* (2013.01); *G05B 2219/40609* (2013.01); *G05B 2219/40617* (2013.01)

(58) Field of Classification Search
USPC ....... 700/245, 247, 250, 253, 254, 255, 258, 700/259; 382/153, 154
See application file for complete search history.

(56) References Cited

U.S. PATENT DOCUMENTS

| | | | |
|---|---|---|---|
| 6,763,284 B2* | 7/2004 | Watanabe | B25J 9/1697 219/121.67 |
| 8,521,339 B2 | 8/2013 | Gariepy et al. | |
| 8,577,083 B2 | 11/2013 | Kirk | |
| 8,646,404 B2 | 2/2014 | Hendricks, Sr. | |
| 8,798,794 B2* | 8/2014 | Walser | B25J 9/1697 382/103 |
| 8,977,395 B2* | 3/2015 | Negishi | B25J 9/1607 700/248 |
| 9,482,524 B2* | 11/2016 | Metzler | G01B 21/04 |
| 9,746,855 B2* | 8/2017 | Kobayashi | G05D 3/00 |
| 2004/0213915 A1 | 10/2004 | Andersen | |
| 2007/0073439 A1* | 3/2007 | Habibi | B25J 9/1697 700/213 |
| 2012/0290130 A1 | 11/2012 | Kapoor | |
| 2013/0078385 A1 | 3/2013 | Hendricks, Sr. | |
| 2014/0046589 A1 | 2/2014 | Metzler et al. | |

* cited by examiner

DRONE ASSISTED ADAPTIVE ROBOT CONTROL

CROSS-REFERENCE TO RELATED APPLICATIONS

This application claims priority to and the benefit of the provisional patent application No. 62/135,190 titled "Drone Assisted Adaptive Robot Control", filed in the United States Patent and Trademark Office on Mar. 19, 2015. The specification of the above referenced patent application is incorporated herein by reference in its entirety.

BACKGROUND

Typical industrial robots are automatically controlled, reprogrammable, and multipurpose manipulator programmable in three or more axes. Typical applications of programmable robots comprise, for example, welding, painting, assembly, pick and place such as packaging and palletizing, product inspection, testing, etc. Programming of motions and sequences for an industrial robot is performed by linking a robot controller of the industrial robot, for example, to a laptop, a desktop computer, a network, etc. Programmable robots are in their fourth iteration of development. Some programmable robots perform repetitive tasks but cannot adapt to a new task or a new environment. The repetitive tasks are determined by programmed routines that specify direction, acceleration, velocity, deceleration, and distance for a series of coordinated motions. Some programmable robots contain machine vision sub-systems acting as their visual sensors and are linked to computers or controllers for receiving instructions to perform repetitive tasks.

In an automotive assembly line, if a vehicle mounted on a skid enters a work environment, for example, a paint booth, on a conveyor, there may be a misalignment of the vehicle with the skid or a misalignment of the skid with the conveyor. Conventional robots are not equipped to account for these misalignments. Some systems use fixed cameras to capture images of the vehicle and determine the location of the vehicle, which are then fed to a programmable robot that is configured to perform a task, for example, painting the vehicle. However, while the programmable robot paints the vehicle, paint may fall on these fixed cameras, which affects the quality of images captured by these fixed cameras. Therefore, camera shutters of these fixed cameras have to be cleaned periodically to ensure the capture of accurate images of the vehicle. Moreover, fixed cameras are typically not mounted on arms of the programmable robot as paint sprays, sealants, etc., would damage the fixed cameras. Furthermore, fixed cameras have to be trained for each type of vehicle. Tooling holes across vehicles may not be in the vicinity of the fixed cameras, which does not allow vehicles of different types to be manufactured on the same automotive assembly line. Furthermore, the fixed cameras cannot access different areas and contours of the vehicles to capture accurate images of the vehicle. The fixed cameras, therefore, cannot capture a real time location of the vehicle and/or output performance of the programmable robot.

A robot and a collection of machines or peripherals constitute a work cell. A typical work cell contains a parts feeder, a molding machine, and a robot. Various machines in the work cell are integrated and controlled by a single computer or a programmable logic controller (PLC). The interaction of the robot with other machines in the work cell is programmed, both with respect to their positions in the work cell and their synchronization with each other, and does not dynamically adapt to a new target object, a new task, or a new environment. Programming of a robotic task in a work cell and associated peripheral systems involves conventional techniques of recording positions of interest, and then developing an application program that moves the robot through these positions of interest based on the application logic. A graphical user interface is used to specify the application logic which may not be applicable to a different target object, a different task, or a different environment, or to real time changes in the environment and misalignments of the target object.

Conventional automated painting equipment, for example, in paint lines for painting automotive vehicle bodies and parts typically utilize a significant number of photocell devices to identify objects and conditions so that the painting equipment may be properly operated in a safe and desired manner. Photocell devices are also often used to detect an intrusion of a human being into various zones of a paint line. Photocell devices are also used to detect the arrival of a vehicle body at a predetermined location within a paint spray station or a paint spray booth. The photocell devices are used for object identification, detection, and sensing along with the automated painting equipment because the photocell devices are non-contact devices that do not scratch a target object, for example, a vehicle body or a vehicle part to be painted. However, the photocell devices can be affected by workers or by environmental factors, for example, dirt, dust, paint mist, or splatter fogging over or otherwise obscuring transparent protective covers of the photocell devices, and must be cleaned often to avoid improper functioning of the photocell devices. The photocell devices may not adequately identify an object or contours of the object if the photocell devices are not critically aligned with a pallet or a holder of a conveyor system.

Hence, there is a long felt need for a method and an adaptive robot control system, in communication with a drone device, that adaptively control a programmable robot to perform a task on a target object while accounting for real time changes in the environment and misalignments of the target object in the work environment. Moreover, there is a need for a method and an adaptive robot control system that identifies contours of the target object to perform a task on the identified contours of the target object. Furthermore, there is a need for a method and an adaptive robot control system that offsets the misalignments of the target object in the work environment.

SUMMARY OF THE INVENTION

This summary is provided to introduce a selection of concepts in a simplified form that are further disclosed in the detailed description of the invention. This summary is not intended to determine the scope of the claimed subject matter.

The method and the adaptive robot control system disclosed herein address the above recited need for adaptively controlling a programmable robot to perform a task on a target object, in communication with a drone device, while accounting for real time changes in a work environment and misalignments of the target object in the work environment. Moreover, the method and the adaptive robot control system disclosed herein identify contours of the target object to perform a task on the identified contours of the target object. Furthermore, the method and the adaptive robot control system disclosed herein offset the misalignments of the target object in the work environment.

The method disclosed herein employs the adaptive robot control system executable by at least one processor configured to execute computer program instructions for adaptively controlling a programmable robot, in communication with the drone device. The adaptive robot control system receives multiple environmental parameters of a work environment where the drone device operates. The adaptive robot control system receives geometrical information of the target object to be operated on by the programmable robot positioned in the work environment. The adaptive robot control system dynamically receives a calibrated spatial location of the target object in the work environment based on the environmental parameters of the work environment where the target object is positioned and a discernment of the target object from the drone device. The drone device is configured to dynamically record and calibrate a spatial location of the target object in the work environment by navigating independently in multiple directions around the target object, accessing inaccessible areas with respect to the target object in the work environment, and capturing one or more images of the target object in each of the directions.

The adaptive robot control system determines parts geometry of the target object based on the dynamically received calibrated spatial location of the target object, the received geometrical information of the target object, and predetermined dimensions of multiple objects stored in a parts geometry database. The adaptive robot control system determines a task trajectory of a task to be performed on the target object by the programmable robot based on the determined parts geometry of the target object, the predetermined dimensions of the objects stored in the parts geometry database, and predetermined task trajectories of the target objects stored in a procedure database. The adaptive robot control system determines a collision-free robotic motion trajectory for the programmable robot based on the determined task trajectory, a model of the target object extracted from the determined parts geometry, and the environmental parameters of the work environment. The adaptive robot control system dynamically transmits the dynamically received calibrated spatial location of the target object, the determined parts geometry, the determined task trajectory, and the determined collision-free robotic motion trajectory to the programmable robot via a communication network to adaptively control the programmable robot to perform the task on the target object, while accounting for misalignments of the target object in the work environment.

In an embodiment, the method disclosed herein employs the drone device comprising at least one processor configured to execute computer program instructions for adaptively controlling the programmable robot. The drone device dynamically captures multiple images of a target object to be operated on in a work environment from multiple directions using one or more three-dimensional cameras configured in the drone device, while navigating independently in multiple directions around the target object in the work environment and accessing inaccessible areas with respect to the target object in the work environment. The drone device records a spatial location of the target object using the dynamically captured images of the target object in the work environment and sensor data obtained from one or more sensors configured in the drone device. The drone device dynamically calibrates the recorded spatial location of the target object in communication with the three-dimensional cameras and the sensors based on the environmental parameters of the work environment and a discernment of the target object. In this embodiment, the adaptive robot control system is deployed in the drone device for determining parts geometry of the target object, a task trajectory of a task to be performed on the target object by the programmable robot, and a collision-free robotic motion trajectory for the programmable robot as disclosed above. The drone device transmits the dynamically calibrated spatial location of the target object, the determined parts geometry, the determined task trajectory, and the determined collision-free robotic motion trajectory to the programmable robot via the communication network to adaptively control the programmable robot to perform the task on the target object while accounting for misalignments of the target object in the work environment.

In one or more embodiments, related systems comprise circuitry and/or programming for effecting the methods disclosed herein; the circuitry and/or programming can be any combination of hardware, software, and/or firmware configured to effect the methods disclosed herein depending upon the design choices of a system designer. Also, various structural elements can be employed depending on the design choices of the system designer.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and components disclosed herein. The description of a method step or a component referenced by a numeral in a drawing is applicable to the description of that method step or component shown by that same numeral in any subsequent drawing herein.

DETAILED DESCRIPTION OF THE INVENTION

Figure 1:
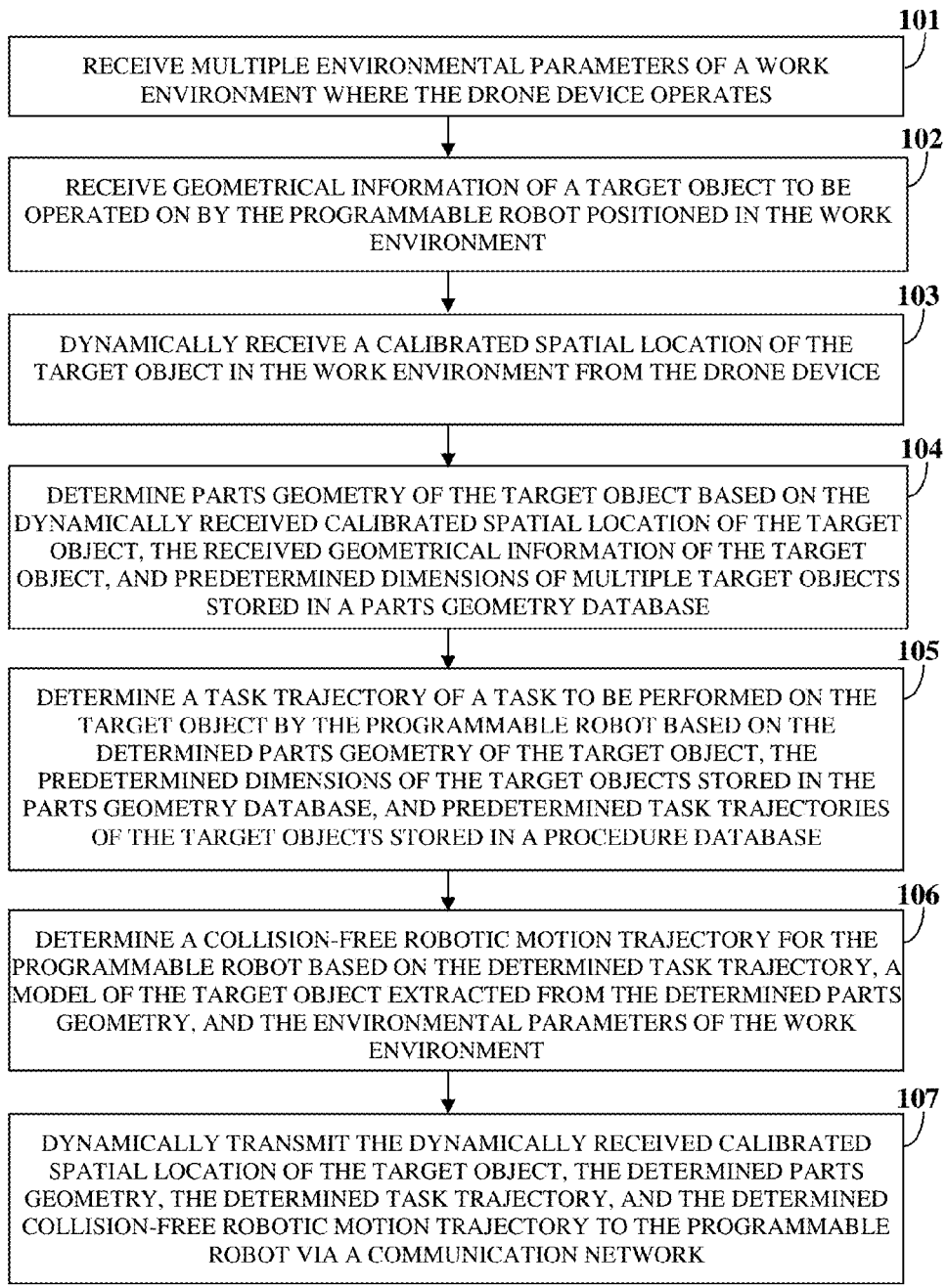
FIG. 1 illustrates a method for adaptively controlling a programmable robot, in communication with a drone device.

FIG. 1 illustrates a method for adaptively controlling a programmable robot, in communication with a drone device. As used herein, "programmable robot" refers to a multi-functional, automated machine programmed to move, for example, material, component parts, tools, or devices through variable programmed motions for performing multiple different tasks on a target object. The programmable robot is, for example, a mobile robot, an industrial robot, a service robot, a factory robot, a military robot, etc. Also, as used herein, "target object" refers to an object positioned in a work environment and targeted by a programmable robot for performance of a task on the object. Also, as used herein, "work environment" refers to an operating environment for performing tasks on a target object. For example, a paint booth is a work environment where a target object such as a vehicle can be painted. Also, as used herein, "drone device" refers to an unmanned aerial device configured to navigate independently beyond a line of sight with human control, and in an embodiment, without human control.

The drone device disclosed herein comprises one or more three-dimensional (3D) cameras mounted thereon for capturing images of a target object positioned in a work environment, while navigating independently in multiple directions around the target object. The drone device captures images of the work environment and the target object using the 3D cameras, records and calibrates a spatial location of the target object, and feeds the calibrated spatial location of the target object to the programmable robot via an adaptive robot control system (ARCS), also referred to as a "drone management system", to allow the programmable robot to adapt to the work environment. The drone device further comprises one or more sensors, for example, camera sensors, optical sensors, motion sensors, position sensors such as global positioning system sensors, inertial sensors such as gyroscope sensors, accelerometers, etc., for detecting a configuration of the work environment and characteristics, positioning, and movements of the target object. In an embodiment, the drone device is an autonomous flying drone device that independently navigates and performs position calibration.

The method disclosed herein employs the adaptive robot control system (ARCS) executable by at least one processor configured to execute computer program instructions for adaptively controlling a programmable robot, in communication with the drone device. The ARCS is a drone management system configured to manage the drone device comprising the three-dimensional (3D) cameras and the sensors. In an embodiment, the ARCS is deployed in the drone device. In another embodiment, the ARCS is deployed in an electronic device, for example, a personal computer, a tablet computing device, a smartphone, etc., positioned external to the drone device and in operable communication with the drone device via a communication network, for example, the internet, a wireless network, a communication network that implements Wi-Fi® of Wi-Fi Alliance Corporation, etc. The ARCS is also in operable communication with the programmable robot via a communication network, for example, the internet, a wired network, a wireless network, a communication network that implements Bluetooth® of Bluetooth Sig, Inc., a communication network that implements Wi-Fi® of Wi-Fi Alliance Corporation, etc.

The adaptive robot control system (ARCS) receives 101 multiple environmental parameters of the work environment where the drone device operates. The environmental parameters comprise, for example, a boundary, an area, dimensions, etc., of the work environment. The environmental parameters of a typical work environment area are, for example, about 40 meters in length, about 5 meters in width, and about 4 meters in height. In an embodiment, a user enters the environmental parameters via a graphical user interface (GUI) provided by the ARCS. In this embodiment, the ARCS receives the environmental parameters of the work environment from a direct entry through the GUI. In another embodiment, the ARCS receives the environmental parameters from one or more three-dimensional (3D) cameras and/or one or more sensors deployed in the drone device via the communication network. The ARCS performs detection of the environmental parameters received from the 3D cameras and the sensors, for example, image sensors of the drone device automatically using different image processing methods when the target object is positioned within an image frame of the drone device in the work environment. Subsequently, the ARCS calculates world coordinates using a position, an altitude, and a 3D camera orientation of the drone device relative to the target object, for example, a vehicle body, received from the drone device via the communication network. An on-board global positioning system (GPS) receiver configured in the drone device transmits the position of the drone device to the ARCS via the communication network. A navigation filter configured in the drone device integrates inertial sensors, for example, gyroscopes and accelerometers, and position sensors, for example, GPS sensors to compute and transmit altitude angles of the drone device to the ARCS via the communication network.

The adaptive robot control system (ARCS) receives 102 geometrical information of a target object to be operated on by the programmable robot positioned in the work environment. The geometrical information comprises, for example, dimensions such as size of the target object, shape of the target object, etc. The geometrical information of the target object, for example, a vehicle, comprises dimensions of the vehicle, for example, about 4342 millimeters in length, about 1800 millimeters in width, and about 1555 millimeters in height. In an embodiment, a user enters the geometrical information of the target object via the graphical user interface (GUI) provided by the ARCS. In this embodiment, the ARCS receives the geometrical information of the target object from a direct entry through the GUI. The Table 1 below exemplarily illustrates different dimensions of vehicles received by the ARCS.

TABLE 1

|  | Vehicle 1 | Vehicle 2 | Vehicle 3 | Vehicle 4 | Vehicle 5 | Vehicle 6 |
|---|---|---|---|---|---|---|
| Length (mm) | 3905 | 3640 | 4278 | 4534 | 4436 | 3595 |
| Width (mm) | 1720 | 1620 | 1680 | 1786 | 1786 | 1595 |
| Height (mm) | 1550 | 1510 | 1520 | 1524 | 1524 | 1490 |
| Wheelbase (mm) | 2555 | 2450 | 245 | 2650 | 2650 | 2385 |

TABLE 2

|  | Rotation X | Rotation Y | Rotation Z | @ Height (mm) | @ Width (mm) |
|---|---|---|---|---|---|
| Position 1 | 30 | 0 | 30 | 3000 | 1000 |
| Position 2 | 35 | 0 | 20 | 3250 | 1500 |
| Position 3 | 45 | 0 | 10 | 3500 | 2000 |
| Position 4 | 45 | 0 | −10 | 3500 | 2500 |
| Position 5 | 35 | 0 | −20 | 3250 | 3000 |
| Position 6 | 30 | 0 | −30 | 3000 | 3500 |

TABLE 3

|  | Rotation X | Rotation Y | Rotation Z | @ Height (mm) | @ Width (mm) |
|---|---|---|---|---|---|
| Position 1 | 0 | 20 | 30 | 3000 | 1000 |
| Position 2 | 0 | 25 | 20 | 3250 | 1500 |
| Position 3 | 0 | 30 | 10 | 3500 | 2000 |
| Position 4 | 0 | 30 | −10 | 3500 | 2500 |
| Position 5 | 0 | 25 | −20 | 3250 | 3000 |
| Position 6 | 0 | 20 | −30 | 3000 | 3500 |

In another embodiment, the adaptive robot control system (ARCS) receives the geometrical information from one or more three-dimensional cameras and/or one or more sensors deployed in the drone device via the communication network. In an embodiment, the drone device uses a medium volume motion capture camera to capture the geometrical information of the target object in the work environment. The specifications of the medium volume motion capture camera configured in the drone device are, for example, a resolution of about 1280×1024 pixels, a maximum frame rate of about 120 frames per second (FPS), a horizontal field of view (FOV) of about 56°, a vertical FOV of about 46°, an accuracy sub-millimeter marker precision, a latency of about 8.3 milliseconds, a maximum range of about 12.2 meters, which means that the medium volume motion capture camera is capable of tracking target objects at a maximum distance of, for example, about 12 meters. In this embodiment, the drone device dynamically transmits images of the target object captured by the medium volume motion capture camera to the ARCS via the communication network.

In an embodiment, the three-dimensional (3D) camera configured on the drone device is equipped with one or more light emitting diodes (LEDs), for example, 28 LEDs configured to emit infrared (IR) light towards the target object. The LEDs are attached to the 3D camera to detect different points on the target object that reflect the emitted IR light. To reflect the emitted IR light, light reflective markers are attached to the target object. The geometrical information comprising, for example, a position and an orientation of the target object is calculated from the light reflective markers. Some of the required image processing is performed in the 3D camera configured in the drone device before the geometrical information is sent to the adaptive robot control system (ARCS). In an embodiment, the ARCS determines the geometrical information of the target object from the images of the target object captured and dynamically transmitted by the drone device to the ARCS. The input data comprising, for example, environmental parameters of the work environment and the geometrical information of the target objects received from the drone device or through a direct entry via the graphical user interface (GUI) provided by the ARCS is processed and executed by an algorithm in the ARCS for adaptively controlling the programmable robot in the work environment.

Table 2 and Table 3 below exemplarily illustrate different positions of the three-dimensional (3D) camera configured in the drone device based on different views of a target object, for example, a vehicle. Table 2 shows the 3D camera positions of the drone device from a rear end of the vehicle and Table 3 shows the 3D camera positions of the drone device from one side of the vehicle.

The drone device dynamically records and calibrates a spatial location of the target object in the work environment by navigating independently in multiple directions around the target object, accessing inaccessible areas with respect to the target object in the work environment, and capturing one or more images of the target object in each of those directions. As used herein, "spatial location" refers to a physical location of the target object defined by geospatial coordinates, for example, latitude and longitude. The drone device moves in a specified path or trajectory in the work environment to cover as much of a work area as possible to maximize a capture volume. As used herein, "capture volume" refers to an area or a volume where the positions of the three-dimensional (3D) camera of the drone device have overlapping fields of view (FOV). The tracking of the light reflective markers positioned on the target object occurs within this capture volume. The light reflective markers are positioned on the target object such that the light reflective markers are visible to at least two positions of the 3D camera of the drone device for the light reflective markers to be tracked. An example of the capture volume resulting from three overlapping fields of view of the 3D camera is provided as follows: The fields of view of the 3D camera positions are, for example, about 56° and about 46° for a horizontal direction and a vertical direction respectively. Humans are typically capable of observing about 180° horizontally and about 120° vertically in comparison with the 3D camera positions. Although the 3D camera mounted on the drone device has considerably smaller FOVs than humans, the drone device navigates in multiple directions to obtain a collection of about sixteen 3D camera positions in the work environment to produce a large capture volume.

The drone device navigates around the work environment and discerns a target object in the work environment as follows. When the drone device encounters a target object that is already known to the drone device, the drone device calibrates a precise spatial location of that target object with respect to known fixed locations stored, for example, in a memory unit of the drone device. When the drone device encounters a new target object that is not known to the drone device, the drone device calibrates a precise spatial location of the new target object based on other objects that the drone device knows. The drone device captures images of the target object and implements a target object detection algorithm to discern the target object. In an embodiment, the drone device compares the captured images of the target object with images stored in a training set stored, for example, in the memory unit of the drone device, to discern the target object. The training set comprises images of other objects that are already known to the drone device with known fixed locations. The target object detection algorithm loops over multiple images in the training set of known objects and attempts to locate each one of these images within an unseen image. The target object detection algorithm returns a positive detection event if the spatial location is found for any of the images in the training set. The positive detection event signals that the target object is found. The target object detection algorithm returns a negative detection event if the spatial location is not found for any of the images in the training set.

The drone device dynamically transmits the calibrated spatial location of the target object to the electronic device deploying the adaptive robot control system (ARCS) via the communication network. The ARCS dynamically receives 103 the calibrated spatial location of the target object in the work environment based on the environmental parameters of the work environment where the target object is positioned and the discernment of the target object from the drone device. The input data comprising, for example, the calibrated spatial location of the target object received from the drone device is processed and executed by an algorithm in the ARCS for adaptively controlling the programmable robot in the work environment. In an embodiment, the ARCS dynamically receives location information comprising, for example, an altitude and a position of the drone device, and 3D camera positions of the drone device from the drone device via the communication network and determines the spatial location of the target object using the received location information. For example, the ARCS compares images received from the drone device with 3D parts geometry data stored in a geometry library, herein referred to as a "parts geometry database" of the ARCS to determine the precise location of tooling holes of a vehicle, and thus determines the precise spatial location of the vehicle. As used herein, "tooling hole" refers to a hole made in a target object for determining positions of parts of the target object.

The adaptive robot control system (ARCS) determines 104 parts geometry of the target object based on the dynamically received calibrated spatial location of the target object, the received geometrical information of the target object, and predetermined dimensions of multiple objects stored in a parts geometry database. As used herein, "parts geometry" refers to geometrical dimensions of each part of the target object. The geometrical dimensions comprise, for example, two-dimensional shapes, three-dimensional shapes, part envelopes, cross sections, contours, feature types such as holes, ribs, etc. The parts geometry database is an organized collection of dimensions of multiple objects predetermined, stored, and maintained by the ARCS. The ARCS stores the determined parts geometry in the parts geometry database. In an example, the ARCS locates a target object, for example, a vehicle in the work environment based on the geometrical information comprising, for example, length×width×height: 4342 millimeters (mm)×1800 mm×1555 mm of the vehicle. The three-dimensional (3D) camera configured in the drone device locates the tooling holes on the vehicle, the spatial location of the vehicle on a conveyor, and a location of the conveyor with respect to the work environment. The drone device generates a coordinate frame to provide a correction to an automatically generated spatial location of the target object to accommodate a variability of the spatial location of the vehicle in the work environment.

The drone device transmits the generated coordinate frame to the ARCS via the communication network to determine the parts geometry of the vehicle and an associated task trajectory.

The adaptive robot control system (ARCS) determines 105 the task trajectory of the task to be performed on the target object by the programmable robot based on the determined parts geometry of the target object, the predetermined dimensions of the objects stored in the parts geometry database, and predetermined task trajectories of the target objects stored in a procedure library, herein referred to as a "procedure database". As used herein, "task trajectory" refers to a path on the target object to be followed by the programmable robot while performing a task on the target object. Examples of a task comprise painting, cleaning, spraying, brushing, etc. The procedure database is an organized collection of multiple task trajectories of multiple tasks predetermined, stored, and maintained by the ARCS. The ARCS stores the determined task trajectory in the procedure database. The ARCS automatically stores the recalibrated, automatically generated task trajectory to accommodate the variability of the location of the target object in the work environment in the procedure database. Furthermore, the three-dimensional (3D) camera in the drone device continues to capture the motion of the programmable robot with respect to the target, thereby forming a closed loop system for re-adjusting the task trajectory for parameters comprising, for example, finish quality, raw material use, etc.

The adaptive robot control system (ARCS) determines 106 a collision-free robotic motion trajectory for the programmable robot based on the determined task trajectory, a model of the target object extracted from the determined parts geometry, and the environmental parameters of the work environment. As used herein, "collision-free robotic motion trajectory" refers to a path or a process of breaking down a movement task into discrete motions that satisfy movement constraints and optimize one or more aspects of the movement task. The three-dimensional (3D) camera mounted on the drone device provides live feedback to the ARCS, which instructs the programmable robot what to look for, for example, a hood of a vehicle. The ARCS recalibrates a previously determined task trajectory with offsets. The continuous monitoring by the 3D camera in the drone device ensures any variance in the work environment, for example, the variance leading to a possible collision, is instantaneously fed to the ARCS for determination of the collision-free robotic motion trajectory for the programmable robot, thereby eliminating a possible collision of the programmable robot in the work environment.

The adaptive robot control system (ARCS) dynamically transmits 107 the dynamically received calibrated spatial location of the target object, the determined parts geometry, the determined task trajectory, and the determined collision-free robotic motion trajectory to the programmable robot via the communication network to adaptively control the programmable robot to perform the task on the target object, while accounting for misalignments of the target object in the work environment. In an embodiment, the ARCS determines a variance in the dynamically received calibrated spatial location of the target object and/or the determined parts geometry of the target object based on the predetermined dimensions of the objects stored in the parts geometry database for offsetting the misalignments of the target object in the work environment. The ARCS performs a coordinate transformation between image space coordinates and real world coordinates of the target object, that are dynamically received from the drone device by a coordinated translation between the x, y image space and the three-dimensional (3D) target object coordinate space for determining any variance in the calibrated spatial location of the target object and/or the parts geometry of the target object and offsetting the misalignments of the target object in the work environment.

In an embodiment, the adaptive robot control system (ARCS) identifies contours of the target object from the determined parts geometry of the target object and determines configurable positions for a component of the programmable robot with respect to the identified contours of the target object for adaptively controlling the programmable robot to move the component of the programmable robot to the determined configurable positions with respect to the identified contours of the target object to perform the task on the identified contours of the target object. The three-dimensional (3D) camera in the drone device continuously captures real world coordinates of the target object and dynamically transmits the real world coordinates to the ARCS via the communication network. The ARCS compares the real world coordinates with preprogrammed dimensions of the target object to detect variances and thus performs automatic calibrations to overcome the variability of the spatial location of the target object in the work environment.

In another embodiment, the adaptive robot control system (ARCS) determines volumetric data associated with the task to be performed on the target object based on the determined parts geometry of the target object. As used herein "volumetric data" refers to an actual depth instead of a simulated depth of the target object that is obtained from the captured three-dimensional (3D) images of the target object. The 3D camera in the drone device tracks the target object at a maximum distance of, for example, about 12 meters, thereby ensuring an adequate safe distance to continuously monitor the target object with the specified dimensions, for example, about 4342 mm in length, about 1800 mm in width, and about 1555 mm in height as disclosed above. The drone device transmits tracking information comprising, for example, images dynamically captured by the 3D camera of the drone device at a maximum distance of, for example, about 12 meters, to the ARCS to identify contours of the target object. In an example, the ARCS determines the amount of paint required to paint different contours of a target object such as a vehicle and accordingly transmits instructions to the programmable robot to vary thickness of the paint around the contours of the vehicle. The ARCS transmits the volumetric data associated with the task to the programmable robot via the communication network to adaptively control the programmable robot to perform the task on the target object while accounting for the contours of the target object. For example, the programmable robot varies thickness of the paint around the contours of the vehicle based on the volumetric data received from the ARCS. The large capture volume produced by the drone device allows a comprehensive capture of programmable robot output performance, for example, the thickness of the paint. The real time capture by the drone device and analysis by the drone device and/or the ARCS allows the programmable robot to perform any task, for example, repair work in real time without the need to pull the target object, for example, a vehicle from an assembly line, which would disrupt a production schedule. In addition to a painting task, the method employing the drone device and the ARCS disclosed herein is used in a sealant robot system for applying sealants on a target object, and in a welding robot system for welding. For these and other applications, the ARCS, in communication with the drone device, performs real time recalibration of the task trajectory and the collision-free robotic motion trajectory for the programmable robot based on the substantially large capture volume produced by the three-dimensional camera configured on the drone device.

Figure 2:
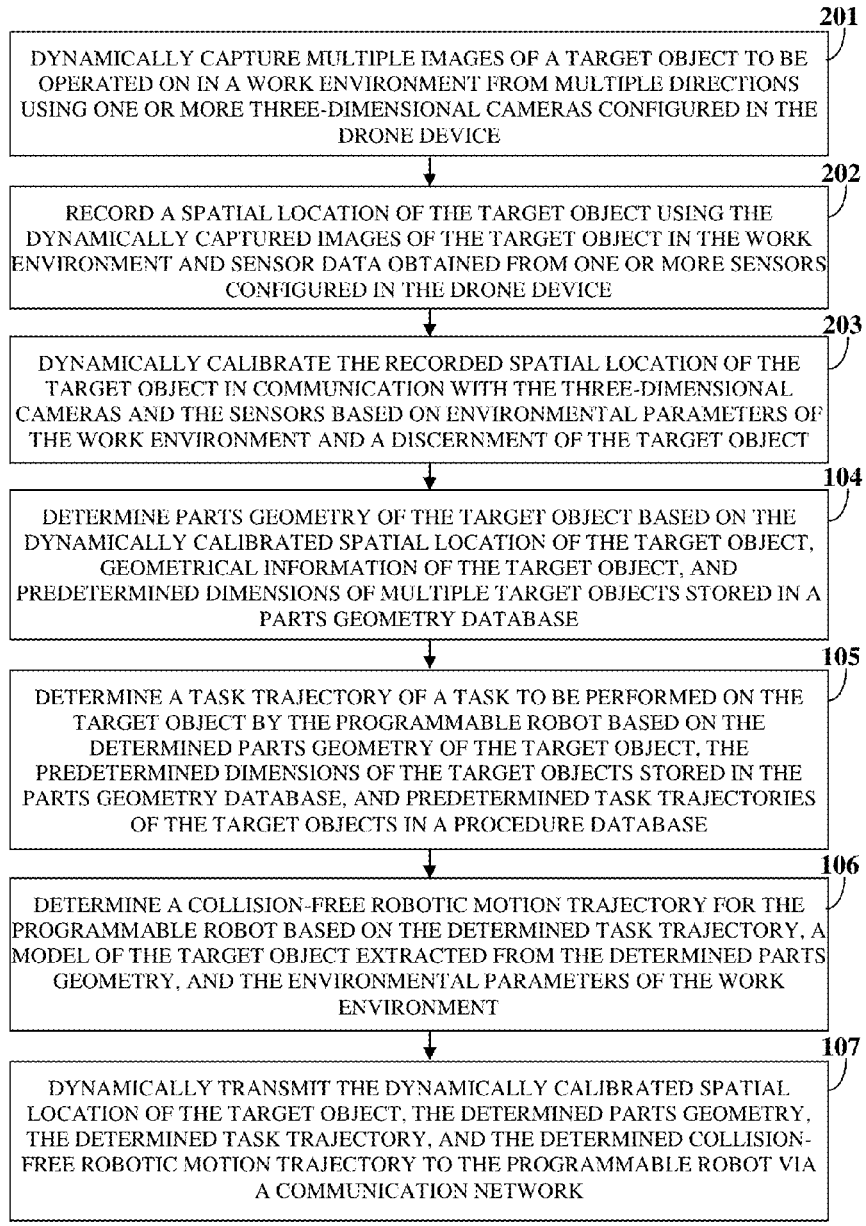
FIG. 2 illustrates an embodiment of the method for adaptively controlling a programmable robot.

FIG. 2 illustrates an embodiment of the method for adaptively controlling a programmable robot. In this embodiment, the method disclosed herein employs the drone device comprising at least one processor configured to execute computer program instructions for adaptively controlling the programmable robot. In this embodiment, the adaptive robot control system (ARCS) is deployed in the drone device and performs the functions disclosed in the detailed description of FIG. 1, from within the drone device. The drone device dynamically captures 201 multiple images of a target object to be operated on in a work environment from multiple directions using one or more three-dimensional cameras configured in the drone device, while navigating independently in the directions around the target object in the work environment and accessing inaccessible areas with respect to the target object in the work environment.

The drone device records 202 a spatial location of the target object using the dynamically captured images of the target object in the work environment and sensor data obtained from one or more sensors configured in the drone device. The sensor data comprises spatial information obtained from one or more sensors, for example, optical sensors, position sensors, inertial sensors, motion sensors, etc., deployed in the drone device. In an embodiment, the drone device prepares one or more maps of the work environment using the three-dimensional (3D) cameras and one or more sensors configured in the drone device. The 3D cameras configured in the drone device continuously capture real world coordinates of the target object for the adaptive robot control system (ARCS) deployed in the drone device. The ARCS compares the real world coordinates with preprogrammed dimensions of the target object to detect variances and thus performs automatic calibration of the spatial location of the target object to overcome a variability of the location of the target object in the work environment. The ARCS updates the calibrated spatial location of the target object in a map database configured in the drone device. In an embodiment, the drone device prepares maps on an automated basis.

The drone device dynamically calibrates 203 the recorded spatial location of the target object in communication with one or more of the three-dimensional (3D) cameras and/or one or more of the sensors based on environmental parameters of the work environment and a discernment of the target object. In an embodiment, the drone device obtains the environmental parameters comprising, for example, a boundary, an area, dimensions, etc., of the work environment from the 3D cameras and/or one or more sensors deployed in the drone device. The drone device compares the target object encountered during the navigation of the drone device with known objects stored in the drone device to obtain the discernment of the target object as disclosed in the detailed description of FIG. 1.

The adaptive robot control system (ARCS) deployed in the drone device determines 104 parts geometry of the target object, determines 105 a task trajectory of a task to be performed on the target object by the programmable robot, determines 106 a collision-free robotic motion trajectory for the programmable robot, and dynamically transmits 107 the calibrated spatial location of the target object, the determined parts geometry, the determined task trajectory, and the determined collision-free motion trajectory to the programmable robot via a communication network to adaptively control the programmable robot to perform the task on the target object while accounting for misalignments of the target object in the work environment as disclosed in the detailed description of FIG. 1. In an embodiment, the drone device obtains geometrical information of the target object for determining the parts geometry of the target object from the dynamically captured images of the target object. In another embodiment, the drone device obtains the environmental parameters of the work environment for determining the collision-free robotic motion trajectory for the programmable robot from the 3D cameras and/or one or more sensors deployed in the drone device. In an embodiment, the ARCS deployed in the drone device identifies contours of the target object and determines configurable positions for a component of the programmable robot with respect to the identified contours of the target object as disclosed in the detailed description of FIG. 1. In another embodiment, the ARCS deployed in the drone device determines volumetric data associated with the task to be performed on the target object as disclosed in the detailed description of FIG. 1. In another embodiment, the ARCS deployed in the drone device determines a variance in the dynamically calibrated spatial location of the target object and/or the determined parts geometry of the target object based on the predetermined dimensions of the objects stored in the parts geometry database for offsetting the misalignments of the target object in the work environment as disclosed in the detailed description of FIG. 1.

Figure 3A:
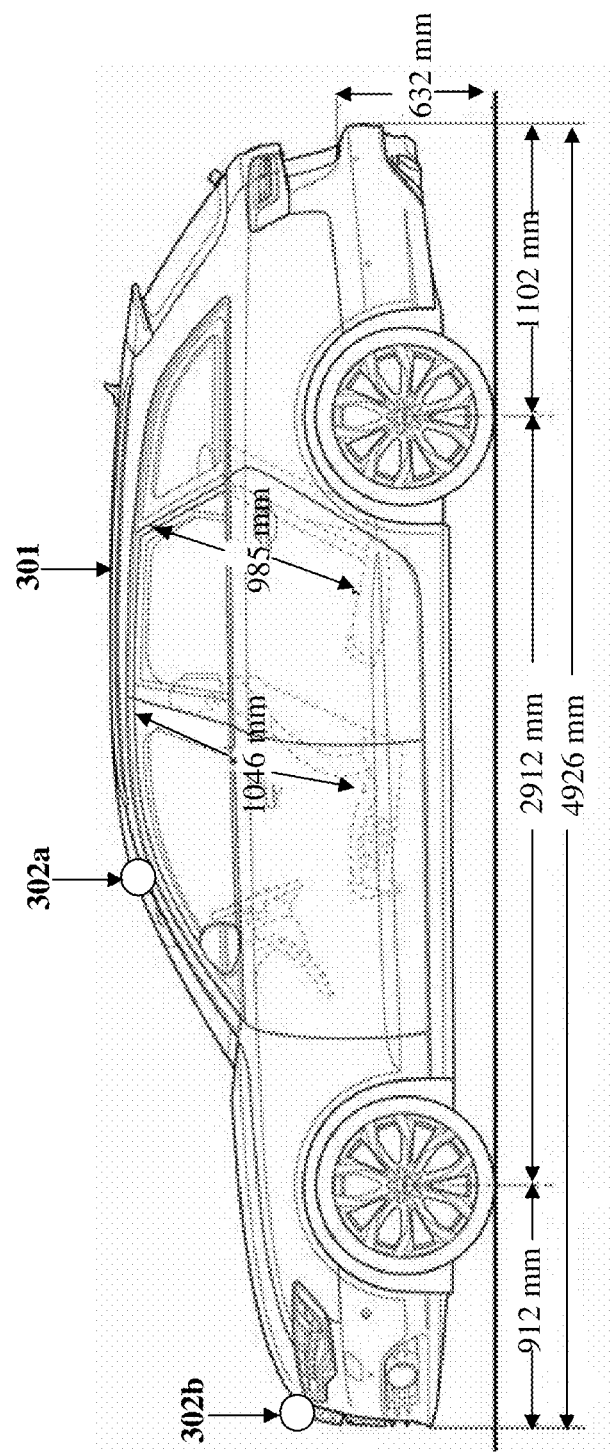
FIGS. 3A-3B exemplarily illustrate a target object as viewed by three-dimensional cameras configured in the drone device.
Figure 3B:
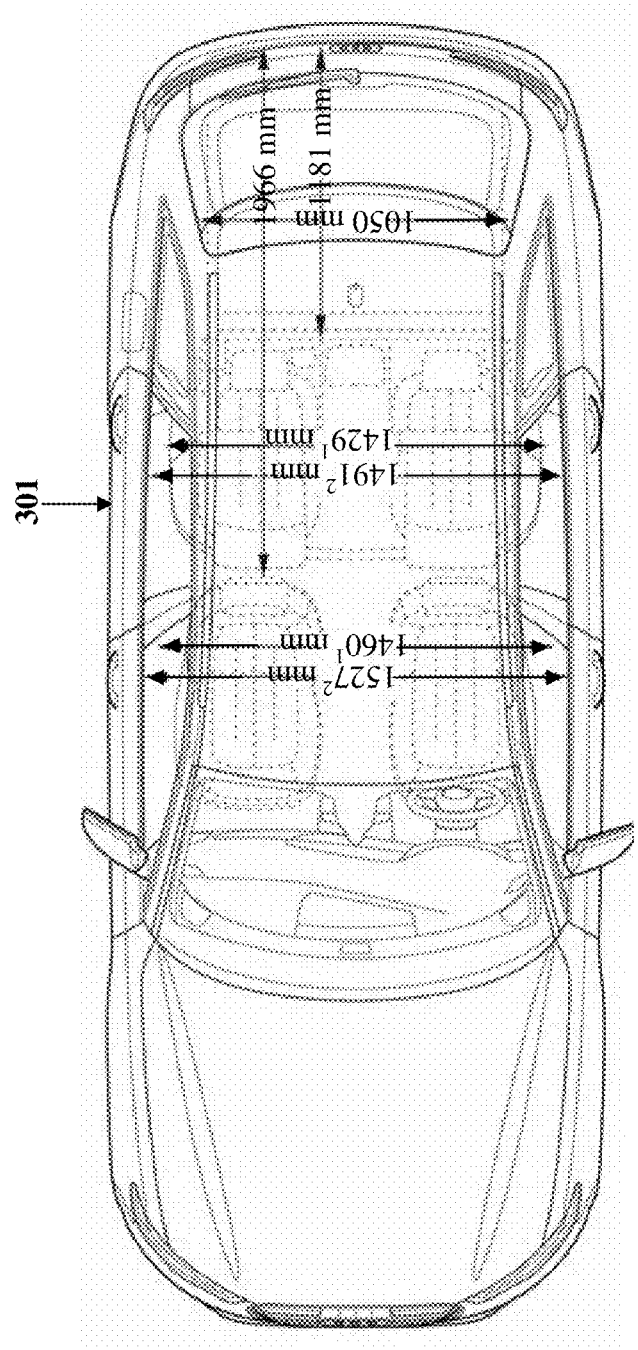

FIGS. 3A-3B exemplarily illustrate a target object as viewed by three-dimensional (3D) cameras configured in the drone device. The target object exemplarily illustrated in FIGS. 3A-3B, is a vehicle 301. FIGS. 3A-3B exemplarily illustrate a side view and a top view of the vehicle 301 respectively, showing geometrical dimensions of different sections of the vehicle 301. Light reflective markers 302a and 302b are attached to different points on the vehicle 301 for reflecting light emitted by light emitting diodes (LEDs) configured on the 3D cameras of the drone device. The light reflective markers 302a and 302b are positioned, for example, on a windshield frame and a front bumper of the vehicle 301 respectively as exemplarily illustrated in FIG. 3A. The light reflective markers 302a and 302b positioned on the vehicle 301 allow the drone device to calculate a position and an orientation of the vehicle 301, and accordingly calibrate a spatial location of the vehicle 301. The light reflective marker 302a corresponds to Marker 1 and the light reflective marker 302b corresponds to Marker 2 in Table 4 below. The drone device calibrates the spatial location of the vehicle 301 based on a discernment of the vehicle 301 using the light reflective markers 302a and 302b, other markers, for example, represented as Marker 3, Marker 4, Marker 5, and Marker 6 positioned at other points on the vehicle 301, and corresponding geometrical dimensions of the vehicle 301 as shown in Table 4. Table 4 below illustrates the positions of the light reflective markers comprising, for example, 302a and 302b on the vehicle 301.

TABLE 4

| | Length (mm) | Width (mm) | Height (mm) |
|---|---|---|---|
| Marker 1 | 1000 | 250 | 1500 |
| Marker 2 | 1000 | 250 | 750 |

TABLE 4-continued

| | Length (mm) | Width (mm) | Height (mm) |
|---|---|---|---|
| Marker 3 | 2000 | 750 | 250 |
| Marker 4 | 2000 | 750 | 250 |
| Marker 5 | 3500 | 1500 | 750 |
| Marker 6 | 3500 | 1500 | 1500 |

Figure 4:
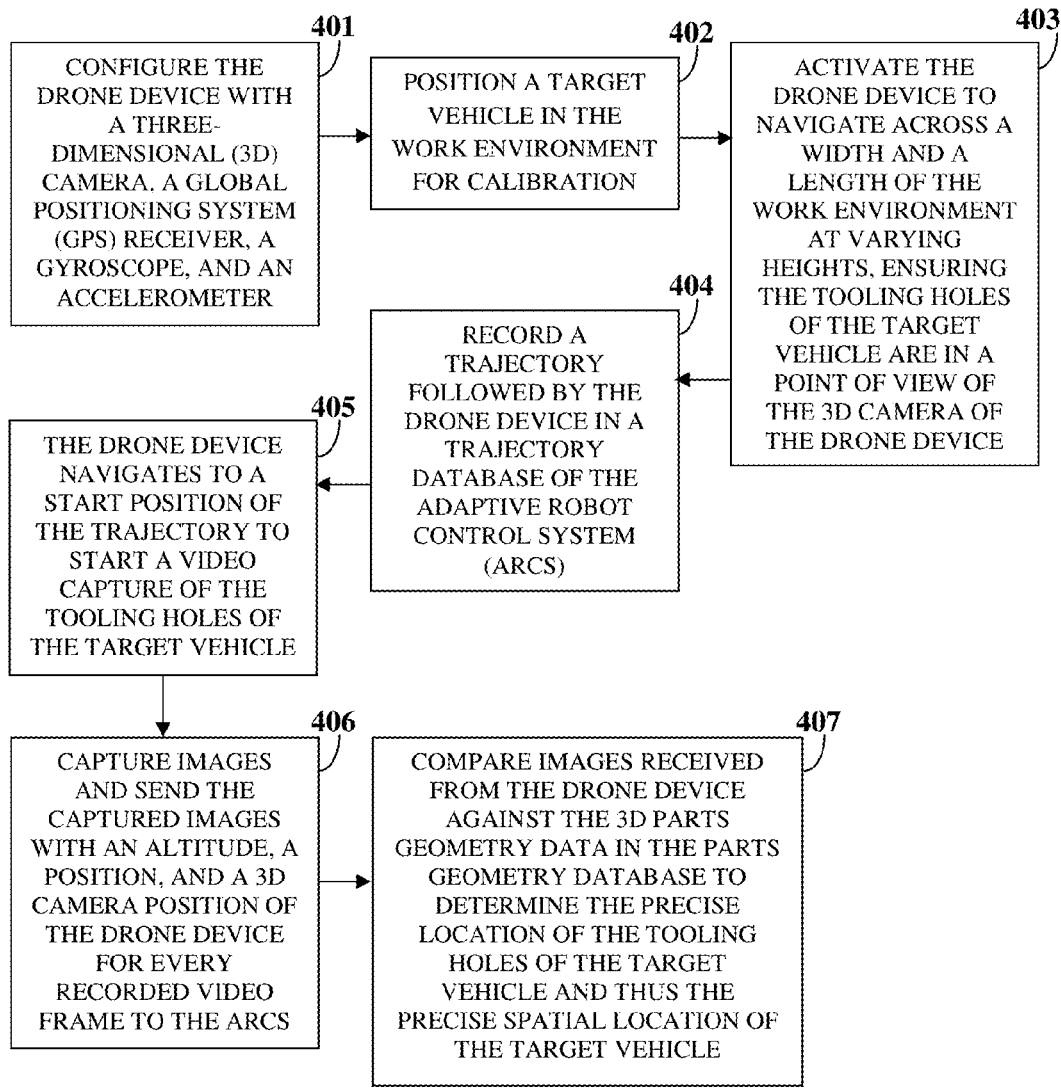
FIG. 4 exemplarily illustrates a flow diagram comprising the steps performed by the drone device and an adaptive robot control system for determining and calibrating a spatial location of a target object.

FIG. 4 exemplarily illustrates a flow diagram comprising the steps performed by the drone device and the adaptive robot control system (ARCS) for determining and calibrating a spatial location of a target object, for example, a target vehicle 301 exemplarily illustrated in FIGS. 3A-3B. A user, for example, an operator configures 401 the drone device with a three-dimensional (3D) camera, a global positioning system (GPS) receiver, a gyroscope, and an accelerometer. The operator positions 402 the target vehicle 301 in the work environment for calibration. The operator activates 403 the drone device to navigate across a width and a length of the work environment at varying heights, ensuring the tooling holes of the target vehicle 301 are in a point of view of the 3D camera of the drone device. The drone device with the 3D camera follows a trajectory, that is, a predetermined path that provides optimal coverage of the target object. In an embodiment, the ARCS deployed in an electronic device, for example, a personal computer of the operator, in communication with the drone device via a communication network, records 404 the trajectory followed by the drone device in a trajectory database of the ARCS. The drone device navigates 405 to a start position of the trajectory to start a video capture of the tooling holes of the target vehicle 301. The 3D camera on the drone device captures a series of, for example, about at least six images of the target object along the trajectory followed by the drone device and sends 406 the captured images with an altitude, a position, and a 3D camera position of the drone device for every recorded video frame to the ARCS via the communication network. The ARCS analyzes and compares 407 the images received from the drone device against 3D parts geometry data comprising, for example, predetermined dimensions of multiple known objects and known fixed locations in the parts geometry database to determine the precise location of the tooling holes of the target vehicle 301, and thus the precise spatial location of the target vehicle 301.

Figure 5:
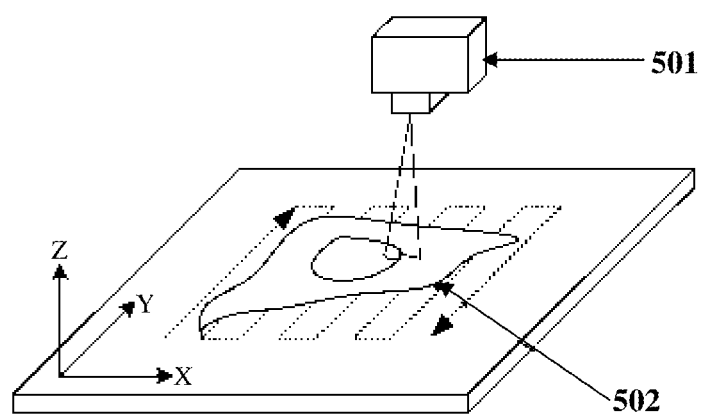
FIG. 5 exemplarily illustrates comparison of an image of a target object captured by the drone device with known geometries of known objects for determining parts geometry of the target object.

FIG. 5 exemplarily illustrates comparison of an image of a target object captured by the drone device with known geometries of known objects for determining parts geometry of the target object. A sensor 501, for example, an image sensor configured in the drone device dynamically captures images of a target object, for example, a target surface 502 to be operated on by the programmable robot and calibrates the spatial location of the target surface 502. The drone device dynamically transmits the captured images of the target surface 502 to the adaptive robot control system (ARCS) via the communication network. The ARCS dynamically receives the captured images of the target surface 502 from the drone device and compares the received images with known geometries of known objects stored in a parts geometry database. The ARCS performs a coordinate translation between real world coordinates of the target surface 502 and X, Y, and Z coordinates of an image space as exemplarily illustrated in FIG. 5, to determine the parts geometry of the target surface 502.

Figure 6A:
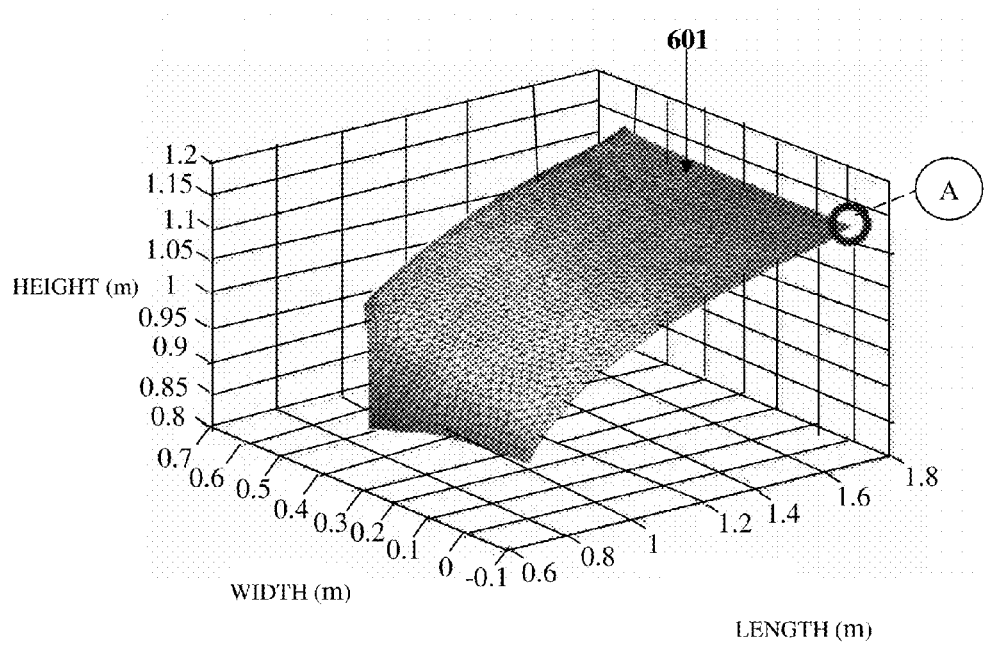
FIG. 6A exemplarily illustrates a graphical representation showing geometrical information of a part of a target object.
Figure 6B:
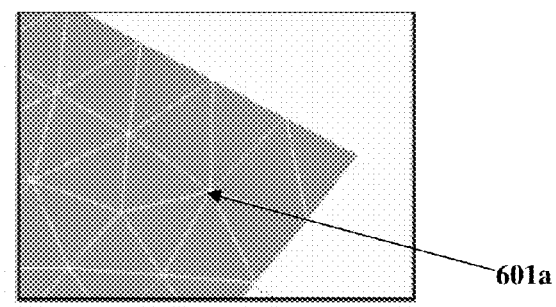
FIG. 6B exemplarily illustrates an enlarged view of a portion marked A in FIG. 6A.

FIG. 6A exemplarily illustrates a graphical representation showing geometrical information of a part of a target object, for example, a hood 601 of a vehicle 301 exemplarily illustrated in FIGS. 3A-3B. FIG. 6B exemplarily illustrates an enlarged view of a portion marked A on the hood 601 in FIG. 6A. When the drone device dynamically transmits the captured images of the vehicle 301 to the adaptive robot control system (ARCS), the ARCS stores the images of the vehicle 301 with respect to different parts, for example, the hood 601, a front right door, a rear right door, a front left door, a rear left door, and a trunk in the parts geometry database, for example, in the format of joint photographic experts group (jpeg) files as exemplarily illustrated in Table 5 below. Table 5 below exemplarily illustrates reference images of the different parts of the vehicle 301 received from the drone device and stored at the time of calibration.

TABLE 5

| Part 1 | Hood | Calibrated reference image from the drone device |
|---|---|---|
| Part 2 | Front right door | frd.jpeg |
| Part 3 | Rear right door | rrd.jpeg |
| Part 4 | Front left door | fld.jpeg |
| Part 5 | Rear left door | rld.jpeg |
| Part 6 | Trunk | trunk.jpeg |

The adaptive robot control system (ARCS) represents each position in the captured image of the vehicle 301 by X, Y, and Z coordinates along with geometric dimensions, for example, height, width, and length in the parts geometry database as exemplarily illustrated in Table 6 below. Table 6 exemplarily illustrates the parts geometry database of the ARCS, showing different positions of the hood 601 with respect to the X, Y, and Z coordinates and geometric dimensions of the hood 601. Position 1 in Table 6 below corresponds to a point 601a of the hood 601 exemplarily illustrated in FIG. 6B.

TABLE 6

| | Rotation X | Rotation Y | Rotation Z | X, Height (mm) | Y, Width (mm) | Z, Length (mm) |
|---|---|---|---|---|---|---|
| Position 1 | 30 | 10 | 10 | 1300 | 1400 | 1100 |
| Position 2 | 33 | 12 | −10 | 1280 | 1450 | 1120 |
| Position 3 | 39 | 9 | 14 | 1240 | 1500 | 1120 |
| Position 4 | 43 | 12 | −10 | 1222 | 1550 | 1130 |
| Position 5 | 48 | 18 | 18 | 1289 | 1580 | 1130 |
| Position 6 | 52 | 22 | 20 | 1310 | 1600 | 1140 |

Figure 7:
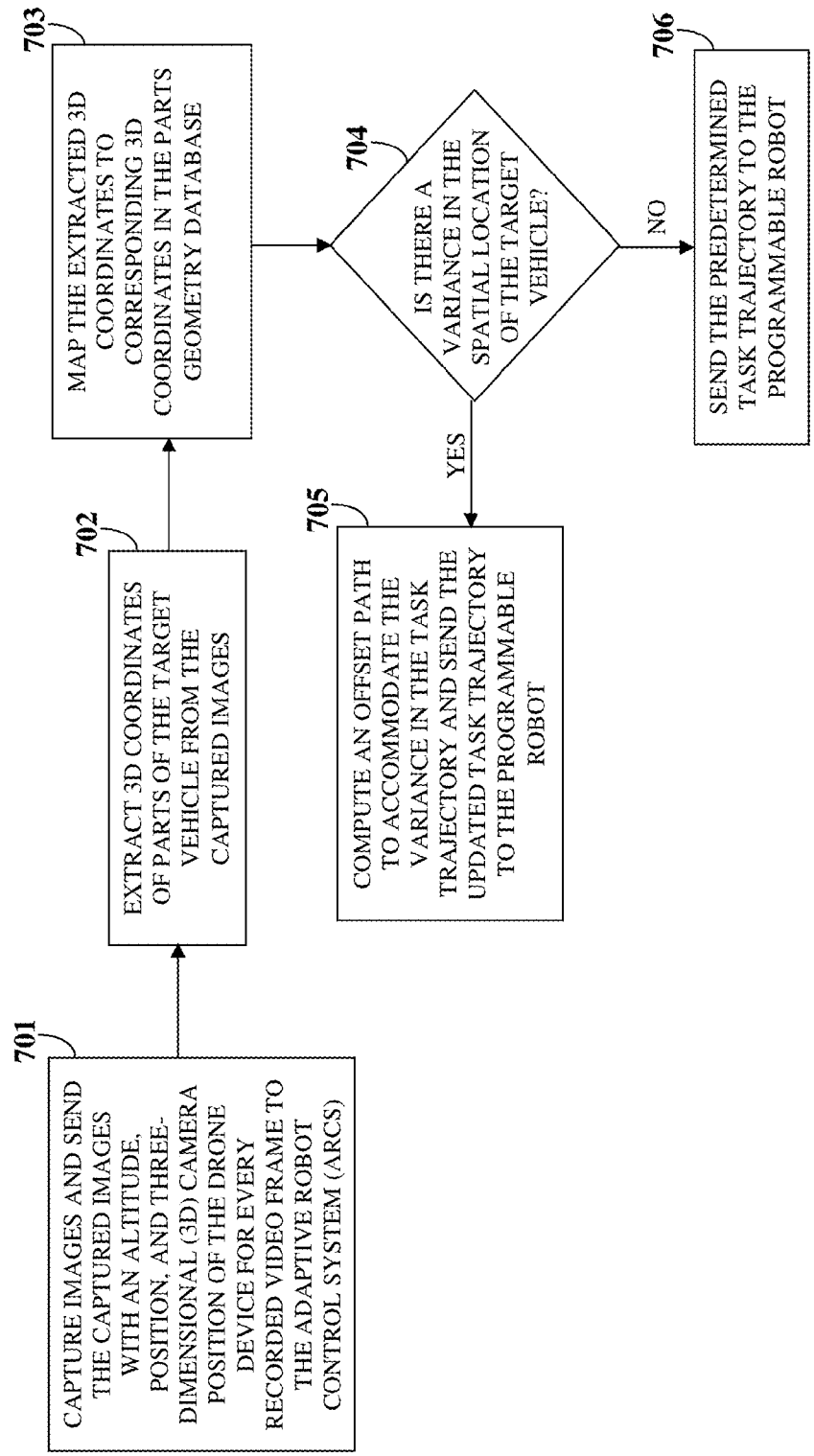
FIG. 7 exemplarily illustrates a flow diagram comprising the steps performed by the drone device and the adaptive robot control system for determining parts geometry of a target object and a task trajectory of a task to be performed on the target object.

FIG. 7 exemplarily illustrates a flow diagram comprising the steps performed by the drone device and the adaptive robot control system (ARCS) for determining parts geometry of a target object, for example, a target vehicle 301 exemplarily illustrated in FIGS. 3A-3B, and a task trajectory of a task to be performed on the target object. The drone device captures images of the target object along a trajectory of the drone device and sends 701 the captured images with an altitude, a position, and a three-dimensional (3D) camera position of the drone device for every recorded video frame to the ARCS. The ARCS extracts 702 the 3D coordinates of parts of the target vehicle 301 from the captured images. The ARCS maps 703 the extracted 3D coordinates to corresponding 3D coordinates in the parts geometry database of the ARCS. The ARCS checks 704 for any variance in the spatial location of the target vehicle 301. If there is a variance in the spatial location of the target vehicle 301, the ARCS computes 705 an offset path to accommodate the variance in the task trajectory and sends the updated task trajectory to the programmable robot to perform a task on the target vehicle 301. If there is no variance in the spatial location of the target vehicle 301, the ARCS sends 706 the predetermined task trajectory to the programmable robot.

Figure 8A:
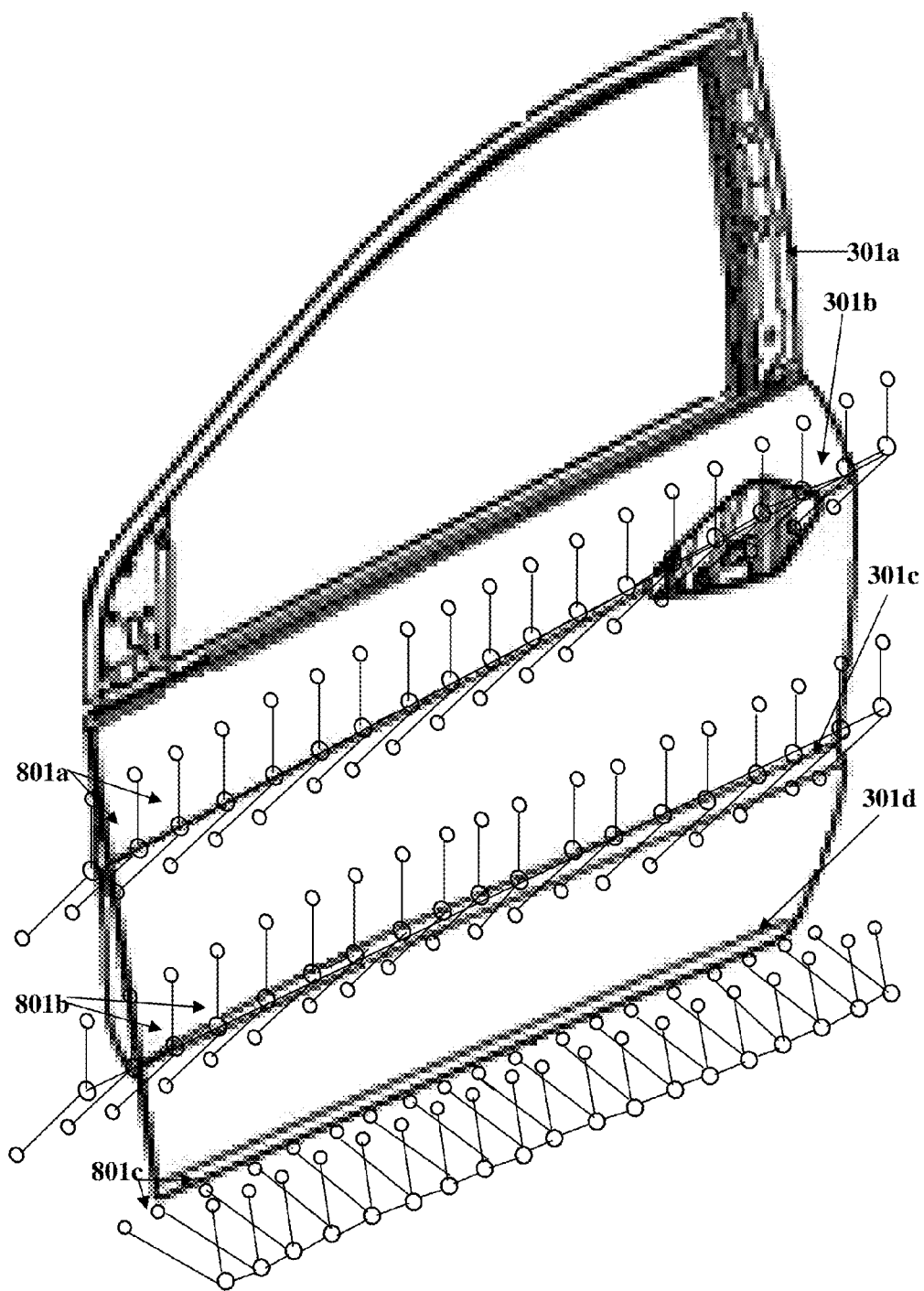
FIG. 8A exemplarily illustrates a perspective view of a part of a target object, showing identification of contours of a target object for determining configurable positions for a component of a programmable robot to perform a task on the contours of the target object.
Figure 8B:
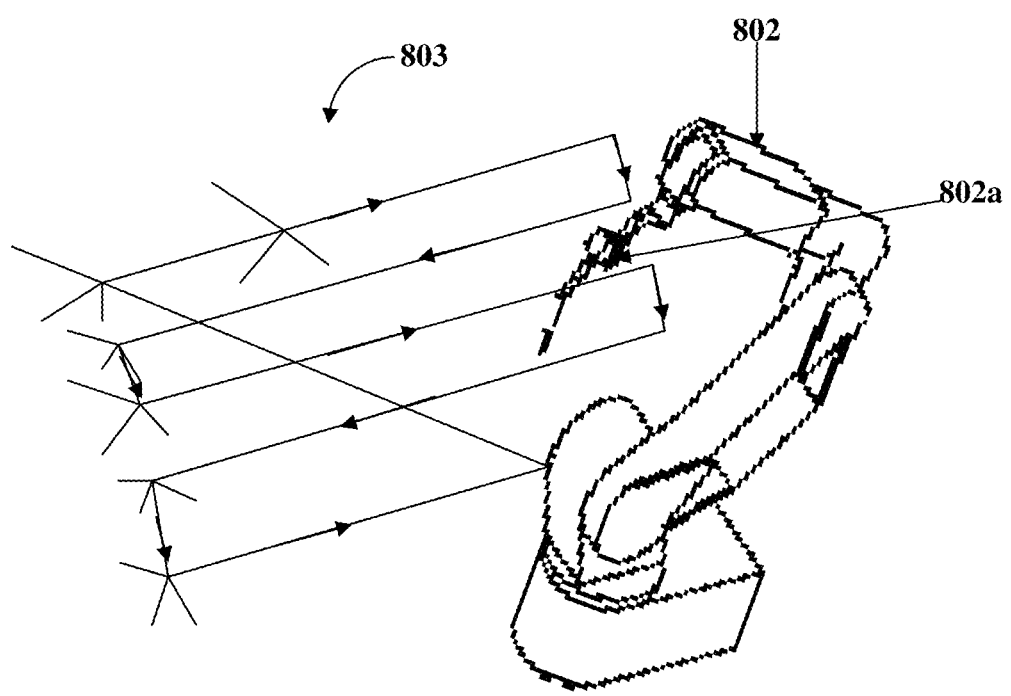
FIG. 8B exemplarily illustrates an outline of the task trajectory of the task to be performed by the programmable robot on the contours of the target object shown in FIG. 8A.

FIG. 8A exemplarily illustrates a perspective view of a part of a target object, for example, a door 301a of a vehicle 301 exemplarily illustrated in FIGS. 3A-3B, showing identification of contours 301b, 301c, and 301d of the door 301a of the vehicle 301 for determining configurable positions for a component, for example, an arm 802a of a programmable robot 802 exemplarily illustrated in FIG. 8B, to perform a task, for example, painting on the contours 301b, 301c, and 301d of the door 301a of the vehicle 301. The adaptive robot control system (ARCS) identifies the contours 301b, 301c, and 301d of the door 301a of the vehicle 301 in the form of coordinates 801a, 801b, and 801c respectively, using the determined parts geometry of the vehicle 301, and determines configurable positions for the arm 802a of the programmable robot 802 with respect to the identified contours 301b, 301c, and 301d of the door 301a of the vehicle 301. The ARCS then adaptively controls the programmable robot 802 to move the arm 802a to the determined configurable positions with respect to the identified contours 301b, 301c, and 301d of the door 301a of the vehicle 301 to paint the identified contours 301b, 301c, and 301d of the door 301a of the vehicle 301. FIG. 8B exemplarily illustrates an outline of a task trajectory 803 of the task to be performed, for example, painting by the programmable robot 802 on the identified contours 301b, 301c, and 301d of the door 301a shown in FIG. 8A. The programmable robot 802 moves the arm 802a to the determined configurable positions with respect to the identified contours 301b, 301c, and 301d of the door 301a of the vehicle 301 along the task trajectory 803 exemplarily illustrated in FIG. 8B, to paint the identified contours 301b, 301c, and 301d of the door 301a of the vehicle 301.

Figure 9:
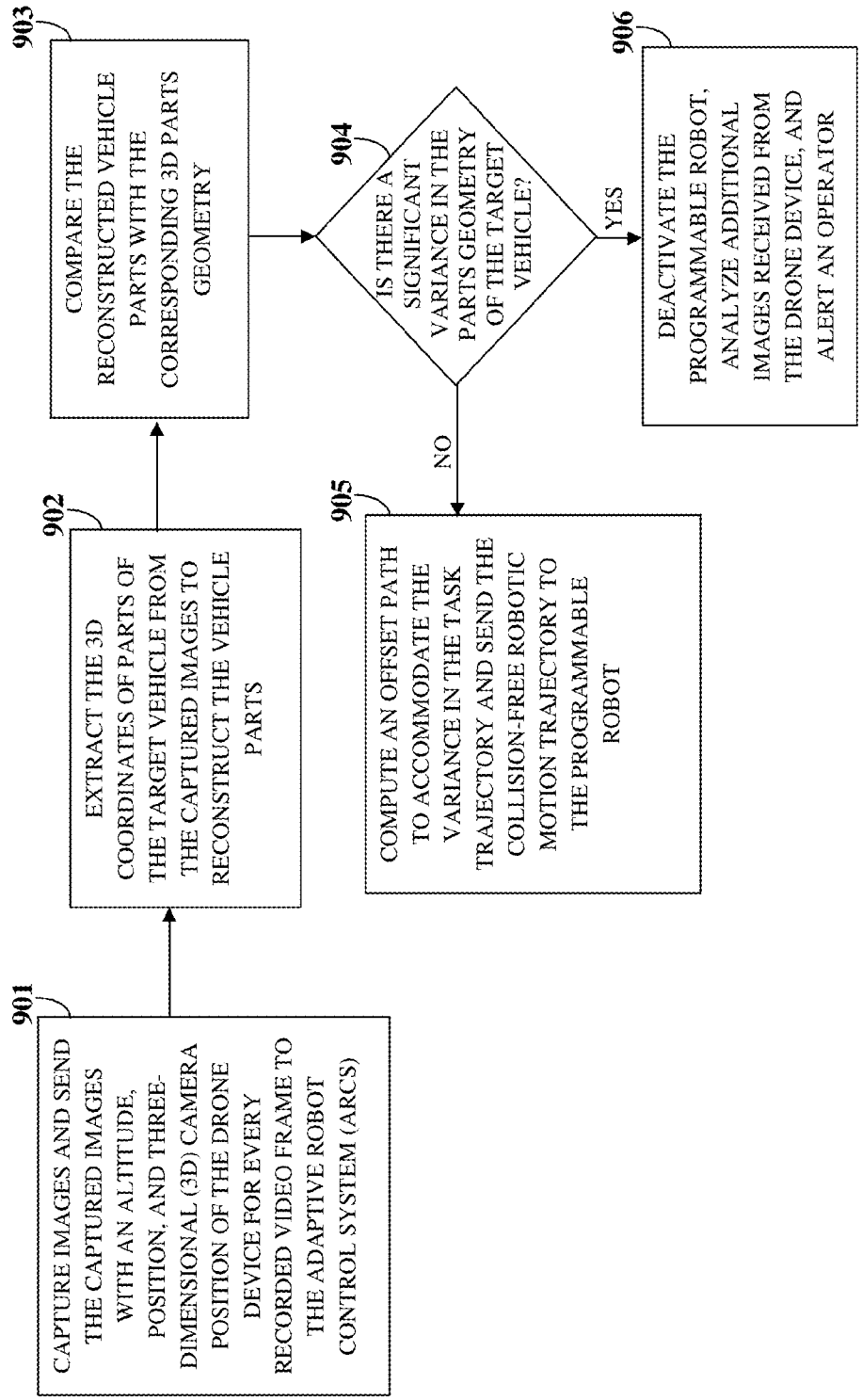
FIG. 9 exemplarily illustrates a flow diagram comprising the steps performed by the drone device and the adaptive robot control system for determining a collision-free robotic motion trajectory for a programmable robot.

FIG. 9 exemplarily illustrates a flow diagram comprising the steps performed by the drone device and the adaptive robot control system (ARCS) for determining a collision-free robotic motion trajectory for a programmable robot 802 exemplarily illustrated in FIG. 8B. The drone device captures images of the target object along a trajectory of the drone device and sends 901 the captured images with an altitude, a position, and a three-dimensional (3D) camera position of the drone device for every recorded video frame to the ARCS. The ARCS extracts 902 the 3D coordinates of parts of a target object, for example, a target vehicle 301 exemplarily illustrated in FIGS. 3A-3B, from the captured images to reconstruct the vehicle parts. The ARCS compares 903 the reconstructed vehicle parts with the corresponding 3D parts geometry. The ARCS checks 904 for a significant variance in the parts geometry of the target vehicle 301. If there is no significant variance in the parts geometry of the target vehicle 301, the ARCS computes 905 an offset path to accommodate the variance in the task trajectory and sends the collision-free robotic motion trajectory to the programmable robot 802 to perform a task on the target vehicle 301. If there is a significant variance in the parts geometry of the target vehicle 301, the ARCS deactivates 906 the programmable robot 802, analyzes additional images received from the drone device, and alerts an operator.

Figure 10:
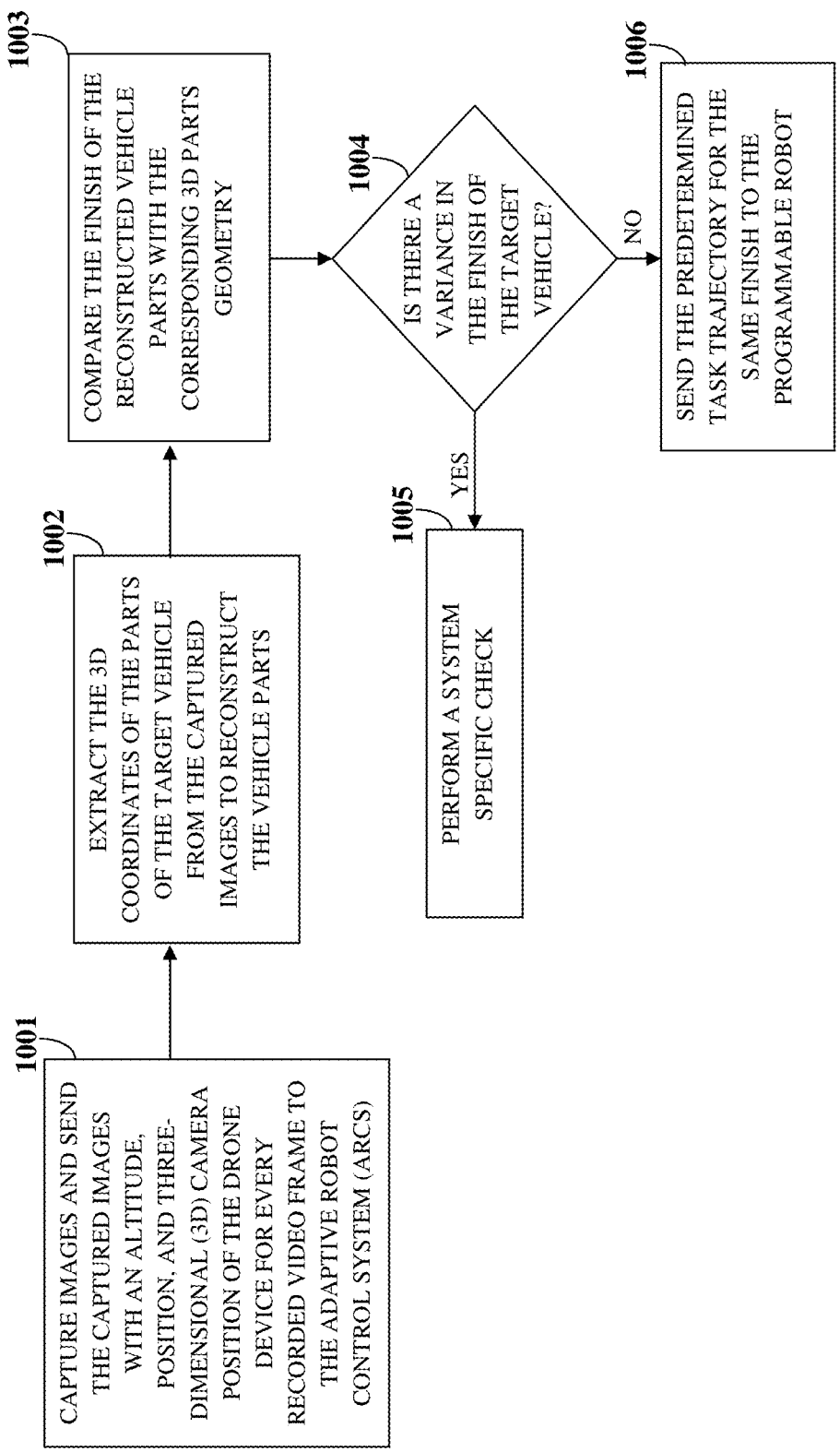
FIG. 10 exemplarily illustrates a flow diagram comprising the steps performed by the drone device and the adaptive robot control system for determining volumetric data associated with the target object.

FIG. 10 exemplarily illustrates a flow diagram comprising the steps performed by the drone device and the adaptive robot control system (ARCS) for determining volumetric data associated with the target object. The drone device captures images of the target object along a trajectory of the drone device and sends 1001 the captured images with an altitude, a position, and a three-dimensional (3D) camera position of the drone device for every recorded video frame to the ARCS. The ARCS extracts 1002 the 3D coordinates of the parts of a target object, for example, a target vehicle 301 exemplarily illustrated in FIGS. 3A-3B, from the captured images to reconstruct the vehicle parts. The ARCS compares 1003 the finish of the reconstructed vehicle parts with the corresponding 3D parts geometry. The ARCS checks 1004 for a variance in the finish of the target vehicle 301. If there is a variance in the finish of the target vehicle 301, the ARCS performs 1005 a system specific check, for example, a paint finish in a paint system. If there is no variance in the finish of the target vehicle 301, the ARCS sends 1006 the predetermined task trajectory for the same finish to a programmable robot 802 exemplarily illustrated in FIG. 8B, to continue painting the target vehicle 301 with the same finish.

Figure 11:
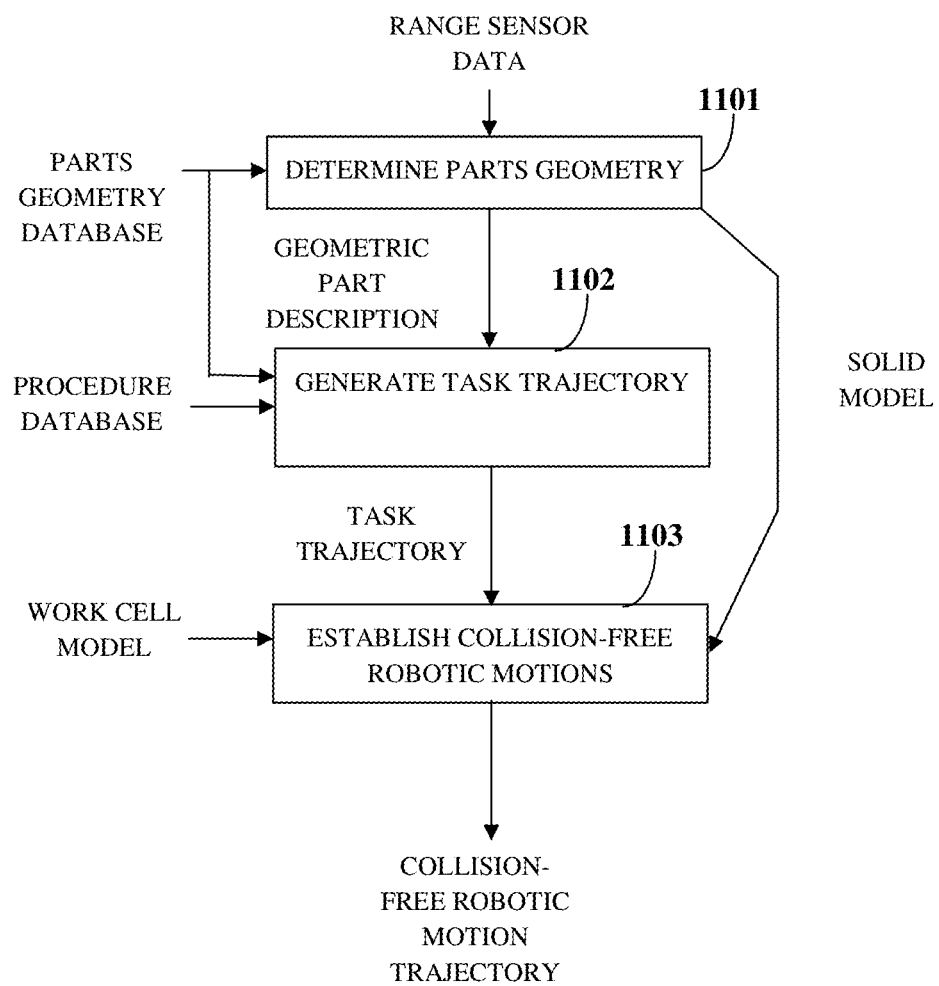
FIG. 11 exemplarily illustrates a flow diagram comprising the steps performed by the adaptive robot control system for determining a collision-free robotic motion trajectory for a programmable robot.

FIG. 11 exemplarily illustrates a flow diagram comprising the steps performed by the adaptive robot control system (ARCS) for determining a collision-free robotic motion trajectory for a programmable robot 802 exemplarily illustrated in FIG. 8B. The ARCS receives range sensor data as an input from the drone device, or in an embodiment, from a user who enters the range sensor data via the graphical user interface provided by the ARCS. The range sensor data comprises, for example, a boundary, an area, dimensions, etc., of the work environment, geometrical information of a target object on which the programmable robot 802 operates, a calibrated spatial location of the target object in the work environment, etc. In an embodiment, the range sensor data comprises environmental parameters received from the sensors deployed in the drone device or entered by the user. The ARCS determines 1101 parts geometry of the target object using the received range sensor data and the parts geometry database. In an embodiment, the ARCS compares the received sensor data with three-dimensional (3D) parts geometry data stored in the parts geometry database to determine the parts geometry of the target object. The ARCS generates 1102 a task trajectory of a task to be performed on the target object by the programmable robot 802 using the determined parts geometry of the target object, the parts geometry database, and the procedure database. The ARCS uses a description of a geometric part of the target object, extracted from the determined parts geometry to generate the task trajectory. The ARCS establishes 1103 collision-free robotic motions using the generated task trajectory and a model of a work cell. As used herein, "work cell" refers to an envelope or a space configured within the work environment where the programmable robot 802 can interact with the target object. The ARCS utilizes a solid model to model a part of the target object during generation of the collision-free robotic motions. The solid model represents a convex hull approximation of a part of the target object. The ARCS determines a collision-free robotic motion trajectory based on the established collision-free robotic motions.

Consider an example of determining a collision-free robotic motion trajectory of a programmable robot 802 configured to paint a vehicle 301 exemplarily illustrated in FIGS. 3A-3B, in a paint booth. The adaptive robot control system (ARCS) receives the range sensor data from the drone device or from a user via the graphical user interface provided by the ARCS to determine the parts geometry of the vehicle 301 using the range sensor data and the parts geometry database, and generates a paint task trajectory for painting the vehicle 301 using the determined parts geometry, the parts geometry database, and the procedure database. The ARCS then utilizes the generated paint task trajectory and the work cell model as inputs to establish collision-free robotic motions. The ARCS then determines the collision-free robotic motion trajectory using the established collision-free robotic motions and dynamically transmits the collision-free robotic motion trajectory to the programmable robot 802 via a communication network for adaptively controlling the programmable robot 802 to paint the vehicle 301 according to the collision-free robotic motion trajectory.

Figure 12:
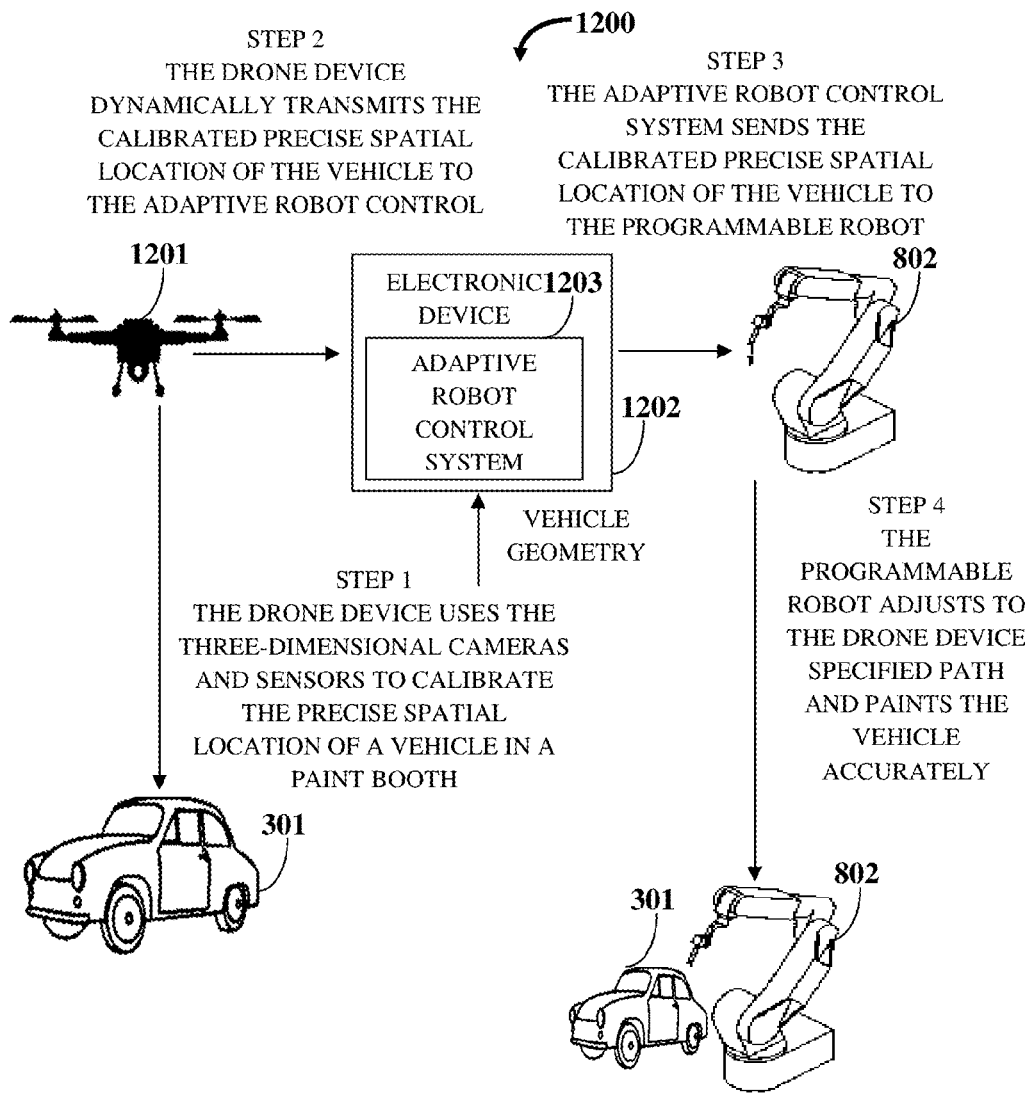
FIG. 12 exemplarily illustrates interaction between components of a system for adaptively controlling a programmable robot, in communication with the drone device.

FIG. 12 exemplarily illustrates interaction between components, for example, 1201, 1203, and 802 of a system 1200 for adaptively controlling a programmable robot 802, in communication with the drone device 1201 to allow the programmable robot 802 to perform a task on a target object, for example, a vehicle 301. The system 1200 disclosed herein comprises the drone device 1201, the adaptive robot control system (ARCS) 1203 deployed in an electronic device 1202, for example, a laptop, a tablet computer, a personal computer, etc., and a programmable robot 802. Consider an example where a vehicle 301 mounted on a skid enters a work environment such as a paint booth on a conveyor in an automotive assembly line. The vehicle 301 may be misaligned with the skid or the skid may be misaligned with the conveyor. The drone device 1201 navigates around the work environment where the vehicle 301 is positioned before the painting process is started. The geometrical information of the vehicle 301 is fed into the ARCS 1203 on the electronic device 1202. The drone device 1201 is capable of independently navigating the work environment and conducting position calibration. The drone device 1201 navigates the work environment in multiple directions independent of ground based obstructions, and is configured to access inaccessible areas around the vehicle 301 in the work environment.

The drone device 1201 dynamically perceives the work environment as follows: The drone device 1201 detects the configuration of the paint booth using motion sensors and camera sensors configured in the drone device 1201, and records the position of the vehicle 301 in terms of content using optical sensors configured in the drone device 1201. The drone device 1201 prepares maps of the paint booth on an automated basis using the three-dimensional (3D) cameras and the sensors configured in the drone device 1201. As exemplarily illustrated in FIG. 12, in step 1, the drone device 1201 calibrates a precise spatial location of the vehicle 301 in the paint booth using the 3D cameras and the sensors mounted thereon. In step 2, the drone device 1201 dynamically transmits the calibrated precise spatial location of the vehicle 301 to the electronic device 1202 that deploys the adaptive robot control system (ARCS) 1203. The ARCS 1203 also receives vehicle geometry as input. The ARCS 1203 utilizes the calibrated precise spatial location to calibrate the path or the task trajectory that the programmable robot 802 takes to ensure that the painting is performed accurately on the vehicle 301 by providing offsets for the misalignments of the vehicle 301. In step 3, the ARCS 1203 sends the calibrated precise spatial location of the vehicle 301 to the programmable robot 802 configured to paint the vehicle 301. The ARCS 1203 integrates the data collected by the drone device 1201 into the existing programmable robot 802 without requiring additional software development. In step 4, the programmable robot 802 adjusts to the drone device specified path or the task trajectory and paints the vehicle 301 accurately. The ARCS 1203 adjusts the path of the programmable robot 802 to the correct position of the vehicle 301.

In the system 1200 disclosed herein, the drone device 1201 comprising the three-dimensional (3D) cameras and the sensors interfaces with the adaptive robot control system (ARCS) 1203 deployed in the electronic device 1202 and with the programmable robot 802 for adaptively controlling the programmable robot 802, and therefore uses more than one computing system. A generic computer using a generic program cannot interface instantaneously with the electronic device 1202 and the programmable robot 802 located in the work environment, where the spatial location of the target object in the work environment is to be dynamically recorded, calibrated, and transmitted to the ARCS 1203 and/or the programmable robot 802 for adaptive control of the programmable robot 802. Furthermore, a generic computer using a generic program cannot dynamically capture multiple images of a target object to be operated on in the work environment from multiple directions using one or more 3D cameras configured in the drone device 1201, while navigating independently in multiple directions around the target object in the work environment and accessing inaccessible areas with respect to the target object in the work environment in accordance with the method steps disclosed above. A generic computer using a generic program also cannot record a spatial location of the target object using the dynamically captured images of the target object in the work environment and sensor data obtained from one or more sensors configured in the drone device 1201 in accordance with the method steps disclosed above. A generic computer using a generic program also cannot dynamically calibrate the recorded spatial location of the target object in communication with the 3D cameras and one or more sensors configured in the drone device 1201 based on environmental parameters of the work environment and a discernment of the target object in accordance with the method steps disclosed above. To dynamically capture multiple images of the target object, record a spatial location of the target object, and dynamically calibrate the recorded spatial location of the target object, the drone device 1201 requires no less than three separate computer programs, the execution of which cannot be easily or manually performed by a person working with a generic computer.

Furthermore, in the system 1200 disclosed herein, the adaptive robot control system (ARCS) 1203 deployed in the electronic device 1202 interfaces with the three-dimensional cameras and the sensors of the drone device 1201 and with the programmable robot 802 for adaptively controlling the programmable robot 802, and therefore uses more than one computing system. A generic computer using a generic program cannot interface instantaneously with the drone device 1201 and the programmable robot 802 located in the work environment, where the parts geometry, the task trajectory, and the collision-free robotic motion trajectory of the target object are to be determined and dynamically transmitted to the programmable robot 802 for adaptive control of the programmable robot 802 in communication with the drone device 1201. Furthermore, a generic computer using a generic program cannot determine parts geometry of the target object, a task trajectory of a task to be performed on the target object by the programmable robot 802, and a collision-free robotic motion trajectory for the programmable robot 802, and dynamically transmit the calibrated spatial location of the target object, the determined parts geometry, the determined task trajectory, and the determined collision-free motion trajectory to the programmable robot 802 via a communication network to adaptively control the programmable robot 802 to perform the task on the target object while accounting for misalignments of the target object in the work environment in accordance with the method steps disclosed above. The ARCS 1203 implements specific computer programs to adaptively control the programmable robot 802 in communication with the drone device 1201. To determine the parts geometry of the target object, the task trajectory of the task to be performed on the target object by the programmable robot 802, and the collision-free robotic motion trajectory for the programmable robot 802, the ARCS 1203 requires no less than three separate computer programs, the execution of which cannot be easily or manually performed by a person working with a generic computer.

Figure 13:
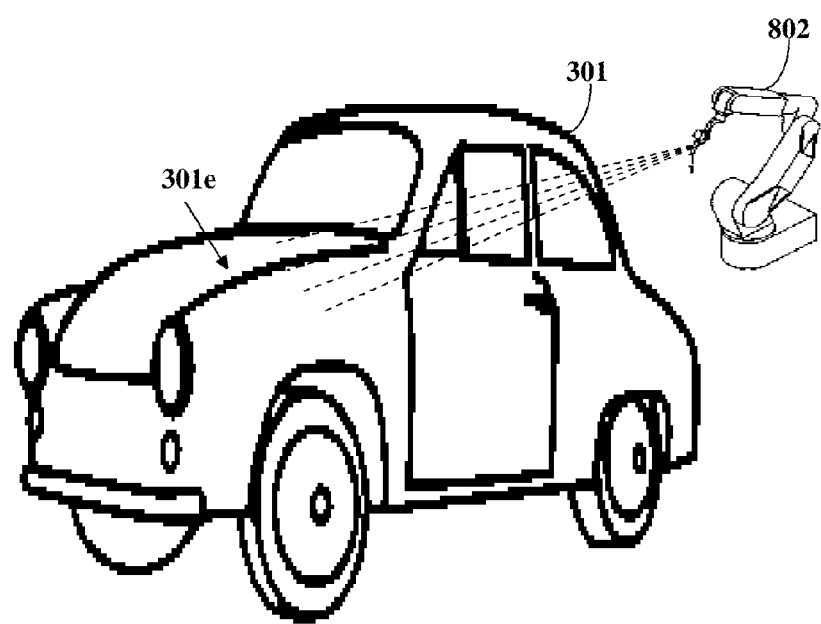
FIG. 13 exemplarily illustrates performance of a dynamic real time flow control performed on a target object, while accounting for contours of the target object.

FIG. 13 exemplarily illustrates performance of a dynamic real time flow control performed on a target object, for example, a vehicle 301, while accounting for contours 301*e* of the target object. Paint thickness must be uniform on the vehicle 301 over all the contours 301*e* of the vehicle 301 for an aesthetic finish. The drone device 1201 exemplarily illustrated in FIG. 12, configured with three-dimensional cameras and sensors, navigates in multiple directions around the vehicle 301 and captures images of the vehicle 301 in those directions. The drone device 1201 records and calibrates locations of the contours 301*e* of the vehicle 301 and locations of a component of the programmable robot 802, for example, a spray gun or a spray fan of the programmable robot 802 with respect to the contours 301*e* of the vehicle 301. The drone device 1201 uses the calibrated locations either to directly control the spray gun or the spray fan of the programmable robot 802 to adapt to the contours 301*e* of the vehicle 301 to achieve paint uniformity or to send signals to a paint control system to control the spray gun or the spray fan to adapt to the contours 301*e* of the vehicle 301 to achieve paint uniformity. In an embodiment, the adaptive robot control system (ARCS) 1203 deployed in the electronic device 1202 exemplarily illustrated in FIG. 12, identifies contours 301*e* of the vehicle 301 from the determined parts geometry of the vehicle 301 and determines configurable positions for the spray gun or the spray fan of the programmable robot 802 with respect to the identified contours 301*e* of the vehicle 301, for adaptively controlling the programmable robot 802 to move the spray gun or the spray fan of the programmable robot 802 to the determined configurable positions with respect to the identified contours 301*e* of the vehicle 301 to paint the identified contours 301*e* of the vehicle 301 uniformly.

Figure 14:
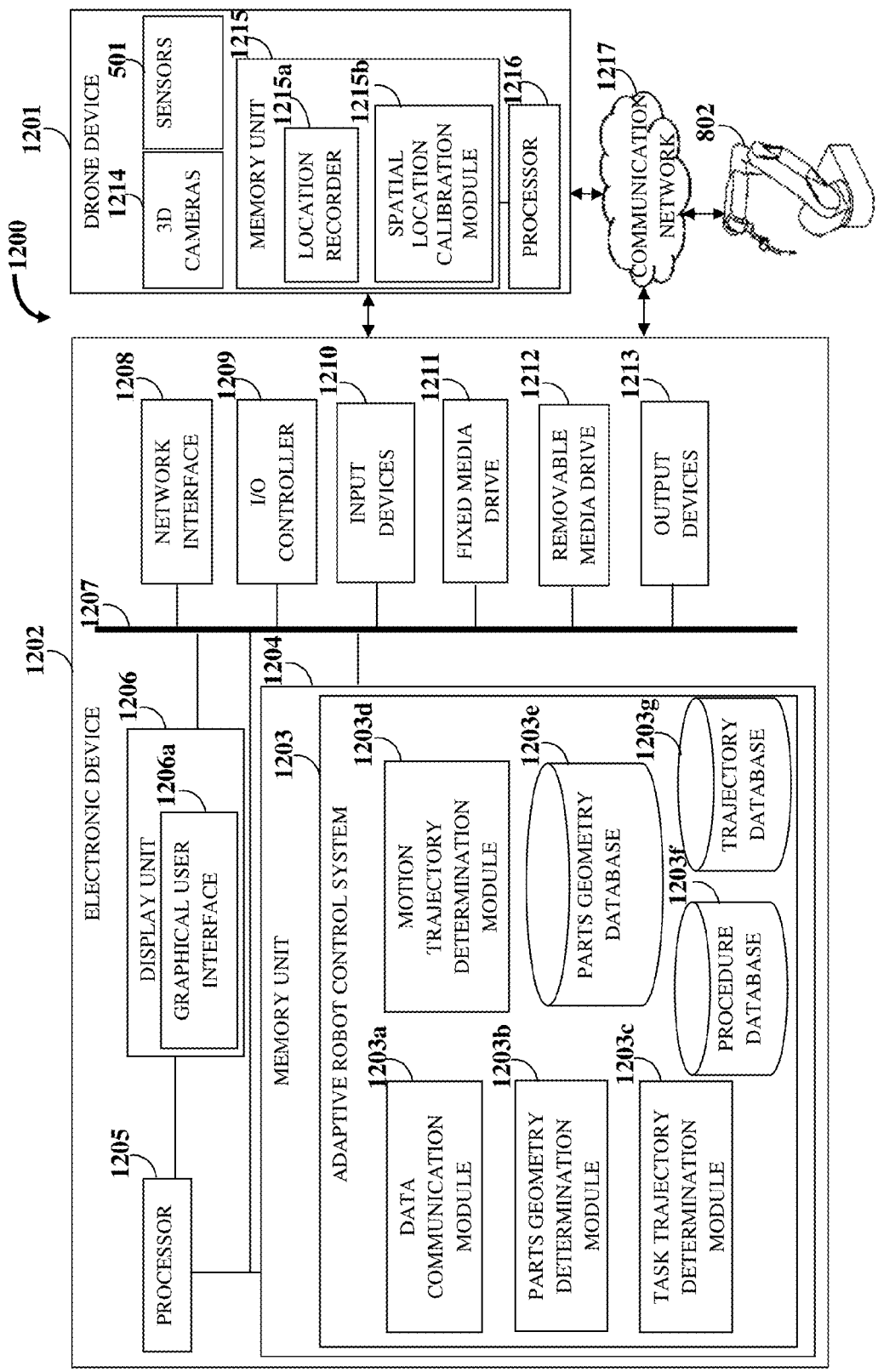
FIG. 14 exemplarily illustrates the system for adaptively controlling a programmable robot.

FIG. 14 exemplarily illustrates the system 1200 for adaptively controlling a programmable robot 802. The system 1200 disclosed herein comprises the drone device 1201 and the adaptive robot control system (ARCS) 1203 implemented in an electronic device 1202 as exemplarily illustrated in FIG. 14. The electronic device 1202 is, for example, a personal computer, a tablet computing device, a mobile computer, a mobile phone, a smart phone, a portable computing device, a personal digital assistant, a laptop, a wearable computing device such as the Google Glass® of Google Inc., the Apple Watch® of Apple Inc., etc., a touch centric device, a workstation, a client device, a portable electronic device, a network enabled computing device, an interactive network enabled communication device, an image capture device, any other suitable computing equipment, combinations of multiple pieces of computing equipment, etc. In an embodiment, the electronic device 1202 is a hybrid computing device that combines the functionality of multiple devices. Examples of a hybrid computing device comprise a cellular telephone that includes a media player functionality, a cellular telephone that includes game and multimedia functions, and a portable device that receives electronic mail (email), supports mobile telephone calls, has a media player functionality, and supports web browsing. In an embodiment, the computing equipment is used to implement applications such as media playback applications, a web browser, a mapping application, an email application, a calendar application, etc. As exemplarily illustrated in FIG. 14, the ARCS 1203 deployed in the electronic device 1202 is positioned external to and in operable communication with the drone device 1201 via a communication network 1217.

The drone device 1201 is an unmanned aerial device comprising a non-transitory computer readable storage medium, for example, a memory unit 1215 for storing programs and data, and at least one processor 1216 communicatively coupled to the non-transitory computer readable storage medium. As used herein, "non-transitory computer readable storage medium" refers to all computer readable media, for example, non-volatile media, volatile media, and transmission media, except for a transitory, propagating signal. Non-volatile media comprise, for example, solid state drives, optical discs or magnetic disks, and other persistent memory volatile media including a dynamic random access memory (DRAM), which typically constitutes a main memory. Volatile media comprise, for example, a register memory, a processor cache, a random access memory (RAM), etc. Transmission media comprise, for example, coaxial cables, copper wire, fiber optic cables, modems, etc., including wires that constitute a system bus coupled to a processor. The non-transitory computer readable storage medium is configured to store computer program instructions defined by modules, for example, 1215a and 1215b of the drone device 1201.

The drone device 1201 comprises one or more three-dimensional (3D) cameras 1214, one or more sensors 501, and a location recorder 1215a and a spatial location calibration module 1215b that are installed and stored in the memory unit 1215 of the drone device 1201. The 3D cameras 1214 mounted on the drone device 1201 dynamically capture multiple images of a target object to be operated on in a work environment from multiple directions, while the drone device 1201 navigates independently in multiple directions around the target object in the work environment and accesses inaccessible areas with respect to the target object in the work environment. The sensors 501, for example, image sensors, optical sensors, position sensors, motion sensors, etc., detect a configuration of the work environment and characteristics, positioning, and movements of the target object. The memory unit 1215 is used for storing program instructions, applications, and data. The memory unit 1215 is, for example, a random access memory (RAM) or another type of dynamic storage device that stores information and instructions for execution by the processor 1216. The memory unit 1215 also stores temporary variables and other intermediate information used during execution of the instructions by the processor 1216. The location recorder 1215a records a spatial location of the target object using the dynamically captured images of the target object in the work environment and sensor data obtained from one or more sensors 501 of the drone device 1201. In an embodiment, the location recorder 1215a prepares one or more maps of the work environment using one or more 3D cameras 1214 and one or more sensors 501 of the drone device 1201. The spatial location calibration module 1215b dynamically calibrates the recorded spatial location of the target object in communication with one or more 3D cameras 1214 and one or more sensors 501 of the drone device 1201 based on environmental parameters of the work environment and a discernment of the target object. The spatial location calibration module 1215b obtains the environmental parameters comprising, for example, a boundary, an area, and dimensions of the work environment from one or more sensors 501 of the drone device 1201. In an embodiment, the spatial location calibration module 1215b compares the target object encountered during the navigation of the drone device 1201 with known objects stored in the drone device 1201 to obtain the discernment of the target object.

The processor 1216 is configured to execute the computer program instructions defined by the location recorder 1215a and the spatial location calibration module 1215b of the drone device 1201. The drone device 1201 disclosed herein is not limited to employing the processor 1216. In an embodiment, the drone device 1201 employs a controller or a microcontroller. The processor 1216 retrieves instructions defined by the location recorder 1215a and the spatial location calibration module 1215b for performing respective functions disclosed above. The processor 1216 executes the modules 1215a and 1215b of the drone device 1201. The processor 1216 retrieves instructions for executing the modules 1215a and 1215b of the drone device 1201 from the memory unit 1215. A program counter determines the location of the instructions in the memory unit 1215. The program counter stores a number that identifies the current position in the program of each of the modules 1215a and 1215b of the drone device 1201. The instructions fetched by the processor 1216 from the memory unit 1215 after being processed are decoded. The instructions are stored in an instruction register in the processor 1216. After processing and decoding, the processor 1216 executes the instructions, thereby performing one or more processes defined by those instructions. At the time of execution, the instructions stored in the instruction register are examined to determine the operations to be performed. The processor 1216 then performs the specified operations. The operations comprise arithmetic operations and logic operations. The drone device 1201 communicates with the electronic device 1202 that deploys the adaptive robot control system (ARCS) 1203 via the communication network 1217.

The electronic device 1202 is a computer system that is programmable using a high level computer programming language. In an embodiment, the adaptive robot control system (ARCS) 1203 is implemented in the electronic device 1202 using programmed and purposeful hardware. The electronic device 1202 communicates with the drone device 1201 and the programmable robot 802 via the communication network 1217, for example, a short range network or a long range network. The communication network 1217 is, for example, the internet, an intranet, a wireless network, a communication network that implements Wi-Fi® of Wi-Fi Alliance Corporation, an ultra-wideband communication network (UWB), a wireless universal serial bus (USB) communication network, a communication network that implements ZigBee® of ZigBee Alliance Corporation, a general packet radio service (GPRS) network, a mobile telecommunication network such as a global system for mobile (GSM) communications network, a code division multiple access (CDMA) network, a third generation (3G) mobile communication network, a fourth generation (4G) mobile communication network, a fifth generation (5G) mobile communication network, a long-term evolution (LTE) mobile communication network, a public telephone network, etc., a local area network, a wide area network, an internet connection network, an infrared communication network, etc., or a network formed from any combination of these networks. In an embodiment, the ARCS 1203 is accessible to users, for example, through a broad spectrum of technologies and devices such as cellular phones, tablet computing devices, etc., with access to the internet.

As exemplarily illustrated in FIG. 14, the electronic device 1202 comprises a non-transitory computer readable storage medium, for example, a memory unit 1204 for storing programs and data, and at least one processor 1205 communicatively coupled to the non-transitory computer readable storage medium. The non-transitory computer readable storage medium is configured to store computer program instructions defined by modules, for example, 1203a, 1203b, 1203c, 1203d, etc., of the adaptive robot control system (ARCS) 1203. The ARCS 1203 is installed and stored in the memory unit 1204 of the electronic device 1202. The memory unit 1204 is used for storing program instructions, applications, and data. The memory unit 1204 is, for example, a random access memory (RAM) or another type of dynamic storage device that stores information and instructions for execution by the processor 1205. The memory unit 1204 also stores temporary variables and other intermediate information used during execution of the instructions by the processor 1205. The electronic device 1202 further comprises a read only memory (ROM) or another type of static storage device that stores static information and instructions for the processor 1205. The processor 1205 is configured to execute the computer program instructions defined by the ARCS 1203. The ARCS 1203 disclosed herein is not limited to employing the processor 1205. In an embodiment, the ARCS 1203 employs a controller or a microcontroller. The processor 1205 executes the modules, for example, 1203a, 1203b, 1203c, 1203d, etc., of the ARCS 1203.

The processors 1216 and 1205 of the drone device 1201 and the electronic device 1202 respectively, refer to any one or more microprocessors, central processing unit (CPU) devices, finite state machines, computers, microcontrollers, digital signal processors, logic, a logic device, an user circuit, an application specific integrated circuit (ASIC), a field-programmable gate array (FPGA), a chip, etc., or any combination thereof, capable of executing computer programs or a series of commands, instructions, or state transitions. In an embodiment, the processors 1216 and 1205 are each implemented as a processor set comprising, for example, a programmed microprocessor and a math or graphics co-processor. The processors 1216 and 1205 are selected, for example, from the Intel® processors such as the Itanium® microprocessor or the Pentium® processors, Advanced Micro Devices (AMD®) processors such as the Athlon® processor, UltraSPARC® processors, microSPARC® processors, Hp® processors, International Business Machines (IBM®) processors such as the PowerPC® microprocessor, the MIPS® reduced instruction set computer (RISC) processor of MIPS Technologies, Inc., RISC based computer processors of ARM Holdings, Motorola® processors, Qualcomm® processors, etc. The processors 1216 and 1205 of the drone device 1201 and the electronic device 1202 respectively, execute an operating system, for example, the Linux® operating system, the Unix® operating system, any version of the Microsoft® Windows® operating system, the Mac OS of Apple Inc., the IBM® OS/2, VxWorks® of Wind River Systems, Inc., QNX Neutrino® developed by QNX Software Systems Ltd., the Palm OS®, the Solaris operating system developed by Sun Microsystems, Inc., the Android® operating system of Google Inc., the Windows Phone® operating system of Microsoft Corporation, the BlackBerry® operating system of BlackBerry Limited, the iOS operating system of Apple Inc., the Symbian™ operating system of Symbian Foundation Limited, etc. The drone device 1201 and the adaptive robot control system (ARCS) 1203 on the electronic device 1202, each employs the operating system for performing multiple tasks.

As exemplarily illustrated in FIG. 14, the hardware architecture of the electronic device 1202 further comprises a display unit 1206, a data bus 1207, a network interface 1208, an input/output (I/O) controller 1209, input devices 1210, a fixed media drive 1211 such as a hard drive, a removable media drive 1212 for receiving removable media, and output devices 1213. The data bus 1207 permits communications between the modules, for example, 1203a, 1203b, 1203c, 1203d, 1203f, 1203g, etc., of the adaptive robot control system (ARCS) 1203 and between the components, for example, 1204, 1205, 1206, 1208, 1209, 1210, 1211, 1212, and 1213. The network interface 1208 enables connection of the ARCS 1203 in the electronic device 1202 to the communication network 1217. In an embodiment, the network interface 1208 is provided as an interface card also referred to as a line card. The network interface 1208 is, for example, one or more of an infrared (IR) interface, an interface implementing Wi-Fi® of Wi-Fi Alliance Corporation, a universal serial bus (USB) interface, a FireWire® interface of Apple Inc., an Ethernet interface, a frame relay interface, a cable interface, a digital subscriber line (DSL) interface, a token ring interface, a peripheral controller interconnect (PCI) interface, a local area network (LAN) interface, a wide area network (WAN) interface, interfaces using serial protocols, interfaces using parallel protocols, Ethernet communication interfaces, asynchronous transfer mode (ATM) interfaces, a high speed serial interface (HSSI), a fiber distributed data interface (FDDI), interfaces based on transmission control protocol (TCP)/internet protocol (IP), interfaces based on wireless communications technology such as satellite technology, radio frequency (RF) technology, near field communication, etc. The I/O controller 1209 controls input actions and output actions performed by the ARCS 1203.

The display unit 1206, via the graphical user interface (GUI) 1206a, displays environmental parameters such as a boundary, an area, etc., of the work environment, the geometrical information of the target object, etc., received by the adaptive robot control system (ARCS) 1203. The GUI 1206a is, for example, a webpage of a website hosted by the ARCS 1203, an online web interface, a web based downloadable application interface, a mobile based downloadable application interface, etc. The display unit 1206 comprises, for example, a video display, a liquid crystal display, a plasma display, an organic light emitting diode (OLED) based display, etc. The ARCS 1203 renders the GUI 1206a on the display unit 1206 to receive the environmental parameters of the work environment and the geometrical information of the target object from a user via the GUI 1206a. The user uses the input devices 1210 for inputting the environmental parameters of the work environment and the geometrical information of the target object into the ARCS 1203 via the GUI 1206a. The input devices 1210 are, for example, a keyboard such as an alphanumeric keyboard, a microphone, a joystick, a pointing device such as a computer mouse, a touch pad, a light pen, a physical button, a touch sensitive display device, a track ball, a pointing stick, any device capable of sensing a tactile input, etc.

The operating system of the electronic device 1202 is responsible for management and coordination of activities and sharing of resources of the electronic device 1202. The operating system further manages security of the electronic device 1202, peripheral devices connected to the electronic device 1202, and network connections. The operating system employed on the electronic device 1202 recognizes, for example, inputs provided by the users of the electronic device 1202 using one of the input devices 1210, the output devices 1213, files, and directories stored locally on the fixed media drive 1211. The operating system on the electronic device 1202 executes different programs using the processor 1205. The processor 1205 and the operating system together define a computer platform for which application programs in high level programming languages are written. The operating system of the electronic device 1202 determines the programming languages used in the ARCS 1203. For example, Java® is used for developing the ARCS 1203 on the electronic device 1202 with an Android® operating system, while Objective-C® of Apple Inc., is used for developing the ARCS 1203 on the electronic device 1202 with the iOS operating system, and the UNITY® libraries and platforms of Unity IPR ApS, LLC., are used for developing the ARCS 1203 for both the Android® operating system and the iOS operating system.

In an embodiment, the adaptive robot control system (ARCS) 1203 is activated on the electronic device 1202 via the graphical user interface 1206a. The ARCS 1203 comprises a data communication module 1203a, a parts geometry determination module 1203b, a task trajectory determination module 1203c, a motion trajectory determination module 1203d, a parts geometry database 1203e, a procedure database 1203f, and a trajectory database 1203g stored in the memory unit 1204. The data communication module 1203a receives multiple images dynamically captured by the drone device 1201 and the calibrated spatial location of the target object from the drone device 1201 via the communication network 1217. In an embodiment, the data communication module 1203a obtains the environmental parameters of the work environmental parameters of the work environment from one or more sensors 501 deployed in the drone device 1201 via the communication network 1217. The data communication module 1203a records a trajectory of the drone device 1201, while the drone device 1201 navigates independently in multiple directions around the target object, in the trajectory database 1203g. The parts geometry determination module 1203b determines parts geometry of the target object based on the dynamically calibrated spatial location of the target object, geometrical information of the target object, and predetermined dimensions of multiple objects stored in the parts geometry database 1203e. In an embodiment, the parts geometry determination module 1203b obtains the geometrical information of the target object from the dynamically captured images of the target object received from the drone device 1201. In another embodiment, the parts geometry determination module 1203b determines a variance in the dynamically calibrated spatial location of the target object and/or the determined parts geometry of the target object based on the predetermined dimensions of the target objects stored in the parts geometry database 1203e for offsetting the misalignments of the target object in the work environment.

The task trajectory determination module 1203c determines a task trajectory of a task to be performed on the target object by the programmable robot 802 based on the determined parts geometry of the target object, the predetermined dimensions of the objects stored in the parts geometry database 1203e, and predetermined task trajectories of the target objects stored in the procedure database 1203f. The motion trajectory determination module 1203d determines a collision-free robotic motion trajectory for the programmable robot 802 based on the determined task trajectory, a model of the target object extracted from the determined parts geometry, and the environmental parameters of the work environment. The data communication module 1203a dynamically transmits the dynamically calibrated spatial location of the target object, the determined parts geometry, the determined task trajectory, and the determined collision-free robotic motion trajectory to the programmable robot 802 via the communication network 1217 to adaptively control the programmable robot 802 to perform the task on the target object while accounting for misalignments of the target object in the work environment. In an embodiment, the parts geometry determination module 1203b identifies contours of the target object from the determined parts geometry of the target object. In this embodiment, the task trajectory determination module 1203c determines configurable positions for a component of the programmable robot 802 with respect to the identified contours of the target object for adaptively controlling the programmable robot 802 to move the component of the programmable robot 802 to the determined configurable positions with respect to the identified contours of the target object to perform the task on the identified contours of the target object. In another embodiment, the parts geometry determination module 1203b determines volumetric data associated with the task to be performed on the target object, based on the determined parts geometry of the target object.

The parts geometry database 1203e, the procedure database 1203f, and the trajectory database 1203g of the adaptive robot control system (ARCS) 1203 can be any storage area or medium that can be used for storing data and files. In an embodiment, the parts geometry database 1203e, the procedure database 1203f, and the trajectory database 1203g can be, for example, a structured query language (SQL) data store or a not only SQL (NoSQL) data store such as the Microsoft® SQL Server®, the Oracle® servers, the MySQL® database of MySQL AB Company, the mongoDB® of MongoDB, Inc., the Neo4j graph database of Neo Technology Corporation, the Cassandra database of the Apache Software Foundation, the HBase® database of the Apache Software Foundation, etc. In another embodiment, the parts geometry database 1203e, the procedure database 1203f, and the trajectory database 1203g can also be a location on a file system. In another embodiment, the parts geometry database 1203e, the procedure database 1203f, and the trajectory database 1203g can be remotely accessed by the ARCS 1203 via the communication network 1217. In another embodiment, the parts geometry database 1203e, the procedure database 1203f, and the trajectory database 1203g are each configured as a cloud based database implemented in a cloud computing environment, where computing resources are delivered as a service over the communication network 1217. As used herein, "cloud computing environment" refers to a processing environment comprising configurable computing physical and logical resources, for example, networks, servers, storage, applications, services, etc., and data distributed over a network, for example, the internet. The cloud computing environment provides on-demand network access to a shared pool of the configurable computing physical and logical resources. In an embodiment, the adaptive robot control system (ARCS) 1203 is a cloud computing based platform implemented as a service for adaptively controlling a programmable robot 802, in communication with the drone device 1201. The ARCS 1203 is developed, for example, using the Google App engine cloud infrastructure of Google Inc., Amazon Web Services® of Amazon Technologies, Inc., the Amazon elastic compute cloud EC2® web service of Amazon Technologies, Inc., the Google® Cloud platform of Google Inc., the Microsoft® Cloud platform of Microsoft Corporation, etc.

Computer applications and programs are used for operating the adaptive robot control system (ARCS) 1203. The programs are loaded onto the fixed media drive 1211 and into the memory unit 1204 of the electronic device 1202 via the removable media drive 1212. In an embodiment, the computer applications and programs are loaded into the memory unit 1204 directly via the communication network 1217. Computer applications and programs are executed by double clicking a related icon displayed on the display unit 1206 using one of the input devices 1210. The output devices 1213 output the results of operations performed by the ARCS 1203.

The processor 1205 of the electronic device 1202 retrieves instructions defined by the data communication module 1203a, the parts geometry determination module 1203b, the task trajectory determination module 1203c, and the motion trajectory determination module 1203d, for performing respective functions disclosed above. The processor 1205 retrieves instructions for executing the modules, for example, 1203a, 1203b, 1203c, 1203d, etc., of the adaptive robot control system (ARCS) 1203 from the memory unit 1204. A program counter determines the location of the instructions in the memory unit 1204. The program counter stores a number that identifies the current position in the program of each of the modules, for example, 1203a, 1203b, 1203c, 1203d, etc., of the ARCS 1203. The instructions fetched by the processor 1205 from the memory unit 1204 after being processed are decoded. The instructions are stored in an instruction register in the processor 1205. After processing and decoding, the processor 1205 executes the instructions, thereby performing one or more processes defined by those instructions.

At the time of execution, the instructions stored in the instruction register are examined to determine the operations to be performed. The processor 1205 then performs the specified operations. The operations comprise arithmetic operations and logic operations. The operating system performs multiple routines for performing a number of tasks required to assign the memory unit 1204 for execution of the modules, for example, 1203a, 1203b, 1203c, 1203d, etc., of the adaptive robot control system (ARCS) 1203. The tasks performed by the operating system comprise, for example, assigning memory to the modules, for example, 1203a, 1203b, 1203c, 1203d, etc., of the ARCS 1203, and to data used by the ARCS 1203, moving data between the memory unit 1204 and disk units, and handling input/output operations. The operating system performs the tasks on request by the operations and after performing the tasks, the operating system transfers the execution control back to the processor 1205. The processor 1205 continues the execution to obtain one or more outputs. The outputs of the execution of the modules, for example, 1203a, 1203b, 1203c, 1203d, etc., of the ARCS 1203 are displayed on the graphical user interface (GUI) 1206a of the display unit 1206 to the user.

For purposes of illustration, the detailed description refers to the adaptive robot control system (ARCS) 1203 being run locally on a single electronic device 1202; however the scope of the method and system 1200 disclosed herein is not limited to the ARCS 1203 being run locally on a single electronic device 1202 via the operating system and the processor 1205, but may be extended to run remotely over the communication network 1217 by employing a web browser and a remote server, a mobile phone, or other electronic devices. In an embodiment, one or more portions of the ARCS 1203 are distributed across one or more computer systems (not shown) coupled to the communication network 1217.

Figure 15:
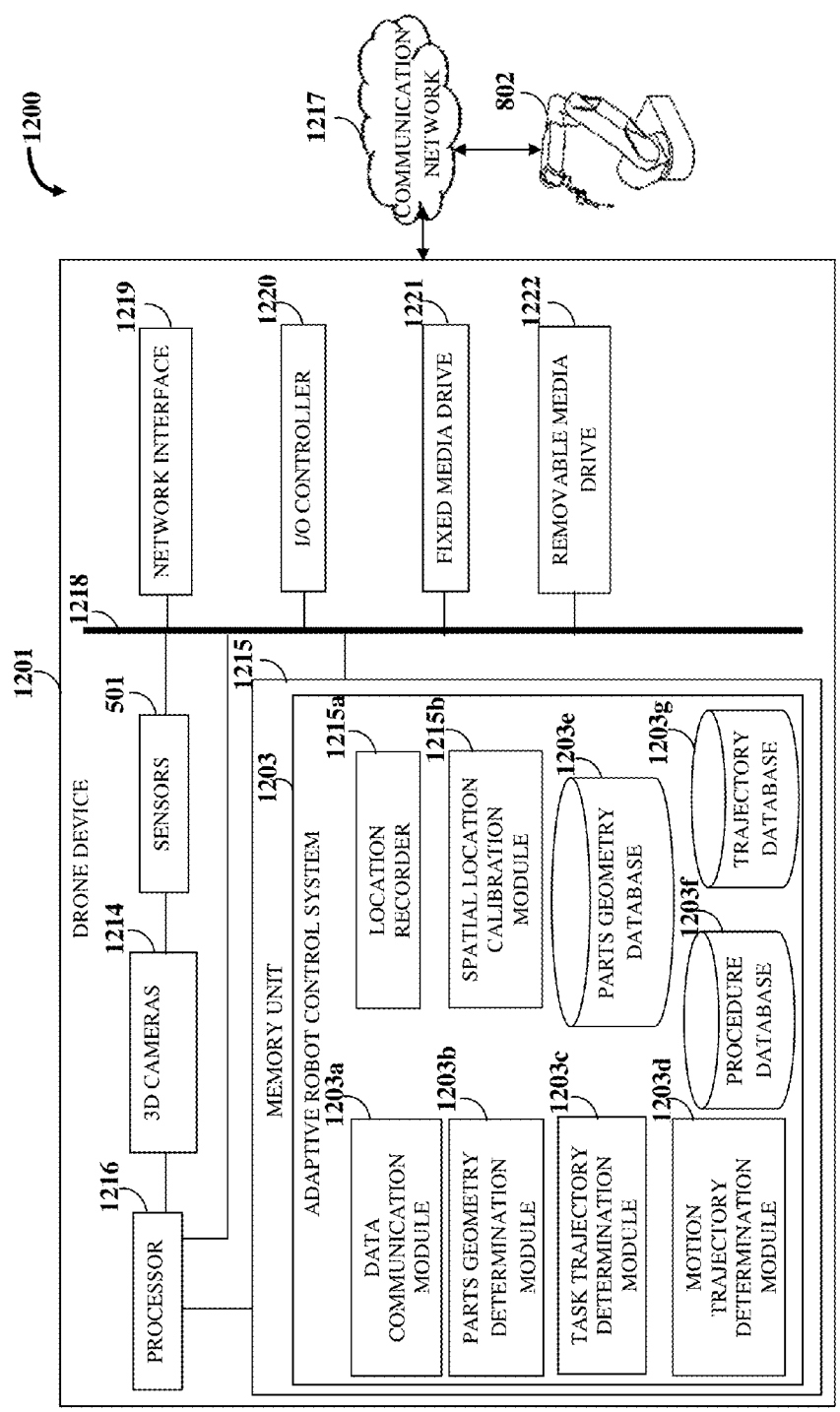
FIG. 15 exemplarily illustrates an embodiment of the system for adaptively controlling a programmable robot.

FIG. 15 exemplarily illustrates an embodiment of the system 1200 for adaptively controlling a programmable robot 802. In this embodiment, the adaptive robot control system (ARCS) 1203 is implemented in the drone device 1201. The programmable robot 802 communicates with the ARCS 1203 deployed in the drone device 1201 via the communication network 1217. As exemplarily illustrated in FIG. 15, the drone device 1201 comprises one or more three-dimensional (3D) cameras 1214, one or more sensors 501, a non-transitory computer readable storage medium, for example, a memory unit 1215 for storing programs and data, and at least one processor 1216 communicatively coupled to the non-transitory computer readable storage medium. The non-transitory computer readable storage medium is configured to store computer program instructions defined by modules, for example, 1215a, 1215b, 1203a, 1203b, 1203c, 1203d, etc., of the ARCS 1203. The ARCS 1203 is installed and stored in the memory unit 1215 of the drone device 1201.

The three-dimensional (3D) cameras 1214 mounted on the drone device 1201 dynamically capture multiple images of a target object to be operated on in a work environment from multiple directions, while the drone device 1201 navigates independently in the directions around the target object in the work environment and accesses inaccessible areas with respect to the target object in the work environment. The sensors 501, for example, camera sensors, optical sensors, position sensors, inertial sensors, motion sensors, etc., in the drone device 1201 detect a configuration of the work environment and characteristics, positioning, and movements of the target object. As exemplarily illustrated in FIG. 15, the hardware architecture of the drone device 1201 further comprises a data bus 1218, a network interface 1219, an input/output (I/O) controller 1220, a fixed media drive 1221 such as a hard drive, and a removable media drive 1222 for receiving removable media. The data bus 1218 in the drone device 1201 permits communications between the modules, for example, 1215a, 1215b, 1203a, 1203b, 1203c, 1203d, 1203e, 1203f, 1203g, etc., of the adaptive robot control system (ARCS) 1203. The network interface 1219 enables connection of the ARCS 1203 in the drone device 1201 to the communication network 1217. The network interface 1219 also enables connection of the 3D cameras 1214 and the sensors 501 to the communication network 1217. The I/O controller 1220 controls input actions and output actions performed by the ARCS 1203.

The adaptive robot control system (ARCS) 1203 is activated on the drone device 1201. In this embodiment, the ARCS 1203 comprises the location recorder 1215a, the spatial location calibration module 1215b, the data communication module 1203a, the parts geometry determination module 1203b, the task trajectory determination module 1203c, the motion trajectory determination module 1203d, the parts geometry database 1203e, the procedure database 1203f, and the trajectory database 1203g stored in the memory unit 1215 of the drone device 1201. The modules, for example, 1215a, 1215b, 1203a, 1203b, 1203c, 1203d, 1203e, 1203f, 1203g, etc., of the ARCS 1203 perform respective functions disclosed in the detailed description of FIG. 14, in the drone device 1201. The operating system employed by the ARCS 1203 of the drone device 1201 recognizes, for example, files and directories stored locally on the fixed media drive 1221. The operating system performs multiple routines for performing a number of tasks required to assign the memory unit 1215 of the drone device 1201 for execution of the modules, for example, 1215*a*, 1215*b*, 1203*a*, 1203*b*, 1203*c*, 1203*d*, etc., of the ARCS 1203 of the drone device 1201.

The non-transitory computer readable storage medium disclosed herein stores computer program codes comprising instructions executable by at least one processor 1216 for adaptively controlling a programmable robot 802. The computer program codes comprise a first computer program code for processing multiple images of a target object to be operated on in a work environment, that are dynamically captured by the drone device 1201 from multiple directions using one or more three-dimensional (3D) cameras 1214 configured in the drone device 1201, while the drone device 1201 navigates independently in the directions around the target object in the work environment and accesses inaccessible areas with respect to the target object in the work environment; a second computer program code for recording a spatial location of the target object using the dynamically captured images of the target object in the work environment and sensor data obtained from one or more sensors 501 configured in the drone device 1201; a third computer program code for dynamically calibrating the recorded spatial location of the target object in communication with one or more 3D cameras 1214 and one or more of the sensors 501 based on environmental parameters of the work environment and a discernment of the target object; a fourth computer program code for determining parts geometry of the target object based on the dynamically calibrated spatial location of the target object, geometrical information of the target object, and predetermined dimensions of multiple objects stored in the parts geometry database 1203*e*; a fifth computer program code for determining a task trajectory of a task to be performed on the target object by the programmable robot 802 based on the determined parts geometry of the target object, the predetermined dimensions of the objects stored in the parts geometry database 1203*e*, and predetermined task trajectories of the target objects stored in the procedure database 1203*f*; a sixth computer program code for determining a collision-free robotic motion trajectory for the programmable robot 802 based on the determined task trajectory, a model of the target object extracted from the determined parts geometry, and the environmental parameters of the work environment; and a seventh computer program code for dynamically transmitting the dynamically calibrated spatial location of the target object, the determined parts geometry, the determined task trajectory, and the determined collision-free robotic motion trajectory to the programmable robot 802 via the communication network 1217 to adaptively control the programmable robot 802 to perform the task on the target object while accounting for misalignments of the target object in the work environment.

In an embodiment, the computer program codes further comprise an eighth computer program code for identifying contours of the target object from the determined parts geometry of the target object and a ninth computer program code for determining configurable positions for a component of the programmable robot 802 with respect to the identified contours of the target object for adaptively controlling the programmable robot 802 to move the component of the programmable robot 802 to the determined configurable positions with respect to the identified contours of the target object to perform the task on the identified contours of the target object. In another embodiment, the computer program codes further comprise a tenth computer program code for determining volumetric data associated with the task to be performed on the target object based on the determined parts geometry of the target object.

The computer program codes further comprise one or more additional computer program codes for performing additional steps that may be required and contemplated for adaptively controlling a programmable robot 802. In an embodiment, a single piece of computer program code comprising computer executable instructions performs one or more steps of the method disclosed herein for adaptively controlling a programmable robot 802. The computer program codes comprising computer executable instructions are embodied on the non-transitory computer readable storage medium. The processor 1216 retrieves these computer executable instructions and executes them. When the computer executable instructions are executed by the processor 1216, the computer executable instructions cause the processor 1216 to perform the steps of the method for adaptively controlling a programmable robot 802.

It will be readily apparent in different embodiments that the various methods, algorithms, and computer programs disclosed herein are implemented on non-transitory computer readable storage media appropriately programmed for computing devices. The non-transitory computer readable storage media participate in providing data, for example, instructions that are read by a computer, a processor or a similar device. In different embodiments, the "non-transitory computer readable storage media" also refer to a single medium or multiple media, for example, a centralized database, a distributed database, and/or associated caches and servers that store one or more sets of instructions that are read by a computer, a processor or a similar device. The "non-transitory computer readable storage media" also refer to any medium capable of storing or encoding a set of instructions for execution by a computer, a processor or a similar device and that causes a computer, a processor or a similar device to perform any one or more of the methods disclosed herein. Common forms of the non-transitory computer readable storage media comprise, for example, a floppy disk, a flexible disk, a hard disk, magnetic tape, a laser disc, a Blu-ray Disc® of the Blu-ray Disc Association, any magnetic medium, a compact disc-read only memory (CD-ROM), a digital versatile disc (DVD), any optical medium, a flash memory card, punch cards, paper tape, any other physical medium with patterns of holes, a random access memory (RAM), a programmable read only memory (PROM), an erasable programmable read only memory (EPROM), an electrically erasable programmable read only memory (EEPROM), a flash memory, any other memory chip or cartridge, or any other medium from which a computer can read.

In an embodiment, the computer programs that implement the methods and algorithms disclosed herein are stored and transmitted using a variety of media, for example, the computer readable media in a number of manners. In an embodiment, hard-wired circuitry or custom hardware is used in place of, or in combination with, software instructions for implementing the processes of various embodiments. Therefore, the embodiments are not limited to any specific combination of hardware and software. The computer program codes comprising computer executable instructions can be implemented in any programming language. Examples of programming languages that can be used comprise Java®, JavaScript®, Perl®, Python®, hypertext preprocessor (PHP), etc. Other object-oriented, functional, scripting, and/or logical programming languages can also be used. In an embodiment, the computer program codes or software programs are stored on or in one or more mediums as object code. In another embodiment, various aspects of the method and the system 1200 disclosed herein are implemented in a non-programmed environment comprising documents created, for example, in a hypertext markup language (HTML), an extensible markup language (XML), or other format that render aspects of the graphical user interface (GUI) 1206a exemplarily illustrated in FIG. 14, or perform other functions, when viewed in a visual area or a window of a browser program. In another embodiment, various aspects of the method and the system 1200 disclosed herein are implemented as programmed elements, or non-programmed elements, or any suitable combination thereof.

Where databases are described such as the parts geometry database 1203e, the procedure database 1203f, and the trajectory database 1203g, it will be understood by one of ordinary skill in the art that (i) alternative database structures to those described may be employed, and (ii) other memory structures besides databases may be employed. Any illustrations or descriptions of any sample databases disclosed herein are illustrative arrangements for stored representations of information. In an embodiment, any number of other arrangements are employed besides those suggested by tables illustrated in the drawings or elsewhere. Similarly, any illustrated entries of the databases represent exemplary information only; one of ordinary skill in the art will understand that the number and content of the entries can be different from those disclosed herein. In another embodiment, despite any depiction of the databases as tables, other formats including relational databases, object-based models, and/or distributed databases are used to store and manipulate the data types disclosed herein. Object methods or behaviors of a database can be used to implement various processes such as those disclosed herein. In another embodiment, the databases are, in a known manner, stored locally or remotely from a device that accesses data in such a database. In embodiments where there are multiple databases in the system 1200, the databases are integrated to communicate with each other for enabling simultaneous updates of data linked across the databases, when there are any updates to the data in one of the databases.

The method and the system 1200 disclosed herein can be configured to work in a network environment comprising one or more computers that are in communication with one or more devices via the communication network 1217. In an embodiment, the computers communicate with the devices directly or indirectly, via a wired medium or a wireless medium such as the Internet, a local area network (LAN), a wide area network (WAN) or the Ethernet, a token ring, or via any appropriate communications mediums or combination of communications mediums. Each of the devices comprises processors, examples of which are disclosed above, that are adapted to communicate with the computers. In an embodiment, each of the computers is equipped with a network communication device, for example, a network interface card, a modem, or other network connection device suitable for connecting to the communication network 1217. Each of the computers and the devices executes an operating system, examples of which are disclosed above. While the operating system may differ depending on the type of computer, the operating system provides the appropriate communications protocols to establish communication links with the communication network 1217. Any number and type of machines may be in communication with the computers.

The method and the system 1200 disclosed herein are not limited to a particular computer system platform, processor, operating system, or network. In an embodiment, one or more aspects of the method and the system 1200 disclosed herein are distributed among one or more computer systems, for example, servers configured to provide one or more services to one or more client computers, or to perform a complete task in a distributed system. For example, one or more aspects of the method and the system 1200 disclosed herein are performed on a client-server system that comprises components distributed among one or more server systems that perform multiple functions according to various embodiments. These components comprise, for example, executable, intermediate, or interpreted code, which communicate over the communication network 1217 using a communication protocol. The method and the system 1200 disclosed herein are not limited to be executable on any particular system or group of systems, and are not limited to any particular distributed architecture, network, or communication protocol.

The foregoing examples have been provided merely for the purpose of explanation and are in no way to be construed as limiting of the method and the system 1200 disclosed herein. While the method and the system 1200 have been described with reference to various embodiments, it is understood that the words, which have been used herein, are words of description and illustration, rather than words of limitation. Further, although the method and the system 1200 have been described herein with reference to particular means, materials, and embodiments, the method and the system 1200 are not intended to be limited to the particulars disclosed herein; rather, the method and the system 1200 extend to all functionally equivalent structures, methods and uses, such as are within the scope of the appended claims. Those skilled in the art, having the benefit of the teachings of this specification, may effect numerous modifications thereto and changes may be made without departing from the scope and spirit of the method and the system 1200 disclosed herein in their aspects.

I claim:

1. A method for adaptively controlling a programmable robot, in communication with a drone device, the method employing an adaptive robot control system executable by at least one processor configured to execute computer program instructions for performing the method comprising:

receiving a plurality of environmental parameters of a work environment where the drone device operates, by the adaptive robot control system;

receiving geometrical information of a target object to be operated on by the programmable robot positioned in the work environment, by the adaptive robot control system;

dynamically receiving a calibrated spatial location of the target object in the work environment based on the environmental parameters of the work environment where the target object is positioned and a discernment of the target object from the drone device by the adaptive robot control system, wherein the drone device is configured to dynamically record and calibrate a spatial location of the target object in the work environment by navigating independently in a plurality of directions around the target object, accessing inaccessible areas with respect to the target object in the work environment, and capturing one or more images of the target object in each of the directions;

determining parts geometry of the target object by the adaptive robot control system based on the dynamically received calibrated spatial location of the target object, the received geometrical information of the target object, and predetermined dimensions of a plurality of objects stored in a parts geometry database;

determining, by the adaptive robot control system, a task trajectory of a task to be performed on the target object by the programmable robot based on the determined parts geometry of the target object, the predetermined dimensions of the objects stored in the parts geometry database, and predetermined task trajectories of the target objects stored in a procedure database;

determining a collision-free robotic motion trajectory for the programmable robot by the adaptive robot control system based on the determined task trajectory, a model of the target object extracted from the determined parts geometry, and the environmental parameters of the work environment; and dynamically transmitting the dynamically received calibrated spatial location of the target object, the determined parts geometry, the determined task trajectory, and the determined collision-free robotic motion trajectory to the programmable robot by the adaptive robot control system via a communication network to adaptively control the programmable robot to perform the task on the target object while accounting for misalignments of the target object in the work environment.

2. The method of claim 1, further comprising identifying contours of the target object from the determined parts geometry of the target object and determining configurable positions for a component of the programmable robot with respect to the identified contours of the target object by the adaptive robot control system for adaptively controlling the programmable robot to move the component of the programmable robot to the determined configurable positions with respect to the identified contours of the target object to perform the task on the identified contours of the target object.

3. The method of claim 1, further comprising determining volumetric data associated with the task to be performed on the target object, by the adaptive robot control system based on the determined parts geometry of the target object.

4. The method of claim 1, further comprising determining a variance in one of the dynamically received calibrated spatial location of the target object, the determined parts geometry of the target object, and a combination thereof by the adaptive robot control system based on the predetermined dimensions of the objects stored in the parts geometry database for offsetting the misalignments of the target object in the work environment.

5. The method of claim 1, wherein the environmental parameters comprise a boundary, an area, and dimensions of the work environment.

6. The method of claim 1, wherein the adaptive robot control system is configured to receive the environmental parameters of the work environment and the geometrical information of the target object from one of a direct entry through a graphical user interface and one or more of three-dimensional cameras and a plurality of sensors deployed in the drone device via the communication network, wherein the sensors comprise image sensors, optical sensors, position sensors, inertial sensors, and motion sensors.

7. A method for adaptively controlling a programmable robot, the method employing a drone device comprising at least one processor configured to execute computer program instructions for performing the method comprising:

dynamically capturing a plurality of images of a target object to be operated on in a work environment from a plurality of directions by the drone device using one or more three-dimensional cameras configured in the drone device, while navigating independently in the directions around the target object in the work environment and accessing inaccessible areas with respect to the target object in the work environment;

recording a spatial location of the target object by the drone device using the dynamically captured images of the target object in the work environment and sensor data obtained from one or more of a plurality of sensors configured in the drone device;

dynamically calibrating the recorded spatial location of the target object in communication with the one or more three-dimensional cameras and the one or more of the sensors by the drone device based on environmental parameters of the work environment and a discernment of the target object;

determining parts geometry of the target object by the drone device based on the dynamically calibrated spatial location of the target object, geometrical information of the target object, and predetermined dimensions of a plurality of objects stored in a parts geometry database;

determining, by the drone device, a task trajectory of a task to be performed on the target object by the programmable robot based on the determined parts geometry of the target object, the predetermined dimensions of the objects stored in the parts geometry database, and predetermined task trajectories of the target objects stored in a procedure database;

determining a collision-free robotic motion trajectory for the programmable robot by the drone device based on the determined task trajectory, a model of the target object extracted from the determined parts geometry, and the environmental parameters of the work environment; and dynamically transmitting the dynamically calibrated spatial location of the target object, the determined parts geometry, the determined task trajectory, and the determined collision-free robotic motion trajectory to the programmable robot by the drone device via a communication network to adaptively control the programmable robot to perform the task on the target object while accounting for misalignments of the target object in the work environment.

8. The method of claim 7, further comprising preparing one or more maps of the work environment by the drone device using the one or more three-dimensional cameras and the one or more of the sensors configured in the drone device.

9. The method of claim 7, further comprising obtaining the environmental parameters of the work environment by the drone device from the one or more three-dimensional cameras and the one or more of the sensors deployed in the drone device, wherein the environmental parameters comprise a boundary, an area, and dimensions of the work environment, and wherein the sensors comprise image sensors, optical sensors, position sensors, inertial sensors, and motion sensors.

10. The method of claim 7, further comprising obtaining the geometrical information of the target object by the drone device from the dynamically captured images of the target object.

11. The method of claim 7, further comprising comparing, by the drone device, the target object encountered during the navigation of the drone device with known objects stored in the drone device to obtain the discernment of the target object.

12. The method of claim 7, further comprising identifying contours of the target object from the determined parts geometry of the target object and determining configurable positions for a component of the programmable robot with respect to the identified contours of the target object by the drone device for adaptively controlling the programmable robot to move the component of the programmable robot to the determined configurable positions with respect to the identified contours of the target object to perform the task on the identified contours of the target object.

13. The method of claim 7, further comprising determining volumetric data associated with the task to be performed on the target object, by the drone device based on the determined parts geometry of the target object.

14. The method of claim 7, further comprising determining a variance in one of the dynamically calibrated spatial location of the target object, the determined parts geometry of the target object, and a combination thereof by the drone device based on the predetermined dimensions of the objects stored in the parts geometry database for offsetting the misalignments of the target object in the work environment by the drone device.

15. A system for adaptively controlling a programmable robot, the system comprising:
    a drone device comprising:
        one or more three-dimensional cameras mounted thereon for dynamically capturing a plurality of images of a target object to be operated on in a work environment from a plurality of directions, while the drone device navigates independently in the directions around the target object in the work environment and accesses inaccessible areas with respect to the target object in the work environment; and
        one or more sensors for detecting a configuration of the work environment and characteristics, positioning, and movements of the target object; and
    at least one processor configured to execute computer program instructions defined by modules deployed in one of the drone device and in an electronic device positioned external to and in operable communication with the drone device via a communication network, the modules comprising:
        a location recorder deployed in the drone device, the location recorder configured to record a spatial location of the target object using the dynamically captured images of the target object in the work environment and sensor data obtained from the one or more sensors configured in the drone device;
        a spatial location calibration module deployed in the drone device, the spatial location calibration module configured to dynamically calibrate the recorded spatial location of the target object in communication with the one or more three-dimensional cameras and the one or more sensors based on environmental parameters of the work environment and a discernment of the target object;
        a parts geometry determination module deployed in the one of the drone device and the electronic device, the parts geometry determination module configured to determine parts geometry of the target object based on the dynamically calibrated spatial location of the target object, geometrical information of the target object, and predetermined dimensions of a plurality of objects stored in a parts geometry database;
        a task trajectory determination module deployed in the one of the drone device and the electronic device, the task trajectory determination module configured to determine a task trajectory of a task to be performed on the target object by the programmable robot based on the determined parts geometry of the target object, the predetermined dimensions of the objects stored in the parts geometry database, and predetermined task trajectories of the target objects stored in a procedure database;
        a motion trajectory determination module deployed in the one of the drone device and the electronic device, the motion trajectory determination module configured to determine a collision-free robotic motion trajectory for the programmable robot based on the determined task trajectory, a model of the target object extracted from the determined parts geometry, and the environmental parameters of the work environment; and
        a data communication module deployed in the one of the drone device and the electronic device, the data communication module configured to dynamically transmit the dynamically calibrated spatial location of the target object, the determined parts geometry, the determined task trajectory, and the determined collision-free robotic motion trajectory to the programmable robot via the communication network to adaptively control the programmable robot to perform the task on the target object while accounting for misalignments of the target object in the work environment.

16. The system of claim 15, wherein the location recorder is further configured to prepare one or more maps of the work environment using the one or more three-dimensional cameras and the one or more sensors configured in the drone device.

17. The system of claim 15, wherein the spatial location calibration module and the data communication module are further configured to obtain the environmental parameters of the work environment from the one or more sensors deployed in the drone device, wherein the environmental parameters comprise a boundary, an area, and dimensions of the work environment, and wherein the sensors comprise image sensors, optical sensors, position sensors, inertial sensors, and motion sensors.

18. The system of claim 15, wherein the parts geometry determination module is further configured to obtain the geometrical information of the target object from the dynamically captured images of the target object.

19. The system of claim 15, wherein the spatial location calibration module is further configured to compare the target object encountered during the navigation of the drone device with known objects stored in the drone device to obtain the discernment of the target object.

20. The system of claim 15, wherein the parts geometry determination module is further configured to identify contours of the target object from the determined parts geometry of the target object, and wherein the task trajectory determination module is further configured to determine configurable positions for a component of the programmable robot with respect to the identified contours of the target object for adaptively controlling the programmable robot to move the component of the programmable robot to the determined configurable positions with respect to the identified contours of the target object to perform the task on the identified contours of the target object.

21. The system of claim 15, wherein the parts geometry determination module is further configured to determine volumetric data associated with the task to be performed on the target object, based on the determined parts geometry of the target object.

22. The system of claim 15, wherein the parts geometry determination module is further configured to determine a variance in one of the dynamically calibrated spatial location of the target object, the determined parts geometry of the target object, and a combination thereof based on the predetermined dimensions of the objects stored in the parts geometry database for offsetting the misalignments of the target object in the work environment.

23. A non-transitory computer readable storage medium having embodied thereon, computer program codes comprising instructions executable by at least one processor for adaptively controlling a programmable robot, the computer program codes comprising:

a first computer program code for processing a plurality of images of a target object to be operated on in a work environment, the images of the target object dynamically captured by a drone device from a plurality of directions using one or more three-dimensional cameras configured in the drone device, while navigating independently in the directions around the target object in the work environment and accessing inaccessible areas with respect to the target object in the work environment;

a second computer program code for recording a spatial location of the target object using the dynamically captured images of the target object in the work environment and sensor data obtained from one or more of a plurality of sensors configured in the drone device;

a third computer program code for dynamically calibrating the recorded spatial location of the target object in communication with the one or more three-dimensional cameras and the one or more of the sensors based on environmental parameters of the work environment and a discernment of the target object;

a fourth computer program code for determining parts geometry of the target object based on the dynamically calibrated spatial location of the target object, geometrical information of the target object, and predetermined dimensions of a plurality of objects stored in a parts geometry database;

a fifth computer program code for determining a task trajectory of a task to be performed on the target object by the programmable robot based on the determined parts geometry of the target object, the predetermined dimensions of the objects stored in the parts geometry database, and predetermined task trajectories of the target objects stored in a procedure database;

a sixth computer program code for determining a collision-free robotic motion trajectory for the programmable robot based on the determined task trajectory, a model of the target object extracted from the determined parts geometry, and the environmental parameters of the work environment; and a seventh computer program code for dynamically transmitting the dynamically calibrated spatial location of the target object, the determined parts geometry, the determined task trajectory, and the determined collision-free robotic motion trajectory to the programmable robot via a communication network to adaptively control the programmable robot to perform the task on the target object while accounting for misalignments of the target object in the work environment.

24. The non-transitory computer readable storage medium of claim 23, wherein the computer program codes further comprise:

an eighth computer program code for identifying contours of the target object from the determined parts geometry of the target object; and a ninth computer program code for determining configurable positions for a component of the programmable robot with respect to the identified contours of the target object for adaptively controlling the programmable robot to move the component of the programmable robot to the determined configurable positions with respect to the identified contours of the target object to perform the task on the identified contours of the target object.

25. The non-transitory computer readable storage medium of claim 23, wherein the computer program codes further comprise a tenth computer program code for determining volumetric data associated with the task to be performed on the target object based on the determined parts geometry of the target object.

* * * * *